(12) United States Patent
Kanai

(10) Patent No.: US 7,743,326 B2
(45) Date of Patent: Jun. 22, 2010

(54) INFORMATION PROCESSING APPARATUS, INFORMATION PROCESSING METHOD, RECORDING MEDIUM, AND PROGRAM

(75) Inventor: Takeshi Kanai, Chiba (JP)

(73) Assignee: Sony Corporation (JP)

( * ) Notice: Subject to any disclaimer, the term of this patent is extended or adjusted under 35 U.S.C. 154(b) by 624 days.

(21) Appl. No.: 10/179,866

(22) Filed: Jun. 25, 2002

(65) Prior Publication Data
US 2003/0009491 A1   Jan. 9, 2003

(30) Foreign Application Priority Data
Jun. 28, 2001   (JP) ............................ P2001-195788

(51) Int. Cl.
G06F 17/00   (2006.01)
(52) U.S. Cl. ..................................... 715/255
(58) Field of Classification Search ................ 715/513, 715/501.1, 526, 500, 530, 200, 201, 255
See application file for complete search history.

(56) References Cited

U.S. PATENT DOCUMENTS

| | | | | |
|---|---|---|---|---|
| 5,239,665 | A * | 8/1993 | Tsuchiya ..................... | 715/776 |
| 5,838,790 | A * | 11/1998 | McAuliffe et al. .......... | 713/176 |
| 5,855,020 | A * | 12/1998 | Kirsch ......................... | 707/10 |
| 6,014,502 | A * | 1/2000 | Moraes ....................... | 709/219 |
| 6,021,426 | A * | 2/2000 | Douglis et al. .............. | 709/200 |
| 6,073,727 | A * | 6/2000 | DiFranza et al. ............ | 187/396 |
| 6,088,707 | A * | 7/2000 | Bates et al. ............... | 715/501.1 |
| 6,141,010 | A * | 10/2000 | Hoyle ......................... | 715/854 |
| 6,195,667 | B1 * | 2/2001 | Duga et al. ................. | 715/234 |
| 6,196,920 | B1 * | 3/2001 | Spaur et al. .................. | 463/42 |
| 6,199,106 | B1 * | 3/2001 | Shaw et al. ................. | 709/217 |
| 6,226,655 | B1 * | 5/2001 | Borman et al. .............. | 715/207 |
| 6,313,828 | B1 * | 11/2001 | Chombo ..................... | 345/169 |
| 6,332,127 | B1 * | 12/2001 | Bandera et al. ............... | 705/14 |
| 6,369,914 | B1 * | 4/2002 | Miura ......................... | 358/403 |
| 6,397,060 | B1 * | 5/2002 | Oikawa ....................... | 455/420 |
| 6,493,746 | B1 * | 12/2002 | Enjou ......................... | 709/208 |
| 6,677,894 | B2 * | 1/2004 | Sheynblat et al. ......... | 342/357.1 |
| 6,711,264 | B1 * | 3/2004 | Matsumoto et al. ......... | 380/283 |
| 6,757,661 | B1 * | 6/2004 | Blaser et al. .................. | 705/14 |

(Continued)

OTHER PUBLICATIONS

Si et al., Maintaining Page Coherence for Dynamic HTML Pages, ACM 1998, pp. 767-773.*

(Continued)

Primary Examiner—Cong-Lac Huynh
(74) Attorney, Agent, or Firm—Lerner, David, Littenberg, Krumholz & Mentlik, LLP

(57) ABSTRACT

An information processing apparatus includes an output unit for outputting information. A first recording unit records first information for causing the output unit to output predetermined information. An analysis unit analyzes the first information. A determination unit determines whether to obtain second information that is referenced by the first information in accordance with an analysis result. An obtaining unit obtains the second information in accordance with a determination result. A second recording unit records the second information. A generation unit generates third information that is output from the output unit in accordance with the analysis result. The first information includes fourth information indicating a condition for obtaining the second information. The determination unit determines whether the condition is satisfied based on the fourth information. The obtaining unit obtains the second information when the condition is satisfied.

7 Claims, 23 Drawing Sheets

U.S. PATENT DOCUMENTS

| | | | |
|---|---|---|---|
| 6,934,684 B2* | 8/2005 | Alpdemir et al. | 704/265 |
| 6,934,868 B2* | 8/2005 | Morrison et al. | 713/500 |
| 6,938,101 B2* | 8/2005 | Hayes et al. | 710/5 |
| 6,986,100 B1* | 1/2006 | Roper et al. | 715/511 |
| 7,009,596 B2* | 3/2006 | Seet et al. | 345/156 |
| 7,228,293 B2* | 6/2007 | DeTreville | 705/57 |
| 7,284,191 B2* | 10/2007 | Grefenstette et al. | 715/230 |
| 7,509,270 B1* | 3/2009 | Hendricks et al. | 705/26 |
| 7,594,173 B2* | 9/2009 | Matsumoto | 715/255 |
| 2001/0021915 A1* | 9/2001 | Cohen et al. | 705/14 |
| 2001/0037258 A1* | 11/2001 | Barritz | 705/26 |
| 2001/0047404 A1* | 11/2001 | Suda | 709/223 |
| 2002/0029182 A1* | 3/2002 | Nakagawa | 705/37 |
| 2002/0042750 A1* | 4/2002 | Morrison | 705/26 |
| 2002/0049828 A1* | 4/2002 | Pekarek-Kostka | 709/217 |
| 2002/0065912 A1* | 5/2002 | Catchpole et al. | 709/224 |
| 2002/0073075 A1* | 6/2002 | Dutta et al. | 707/3 |
| 2002/0087475 A1* | 7/2002 | Okayama et al. | 705/51 |
| 2002/0120635 A1* | 8/2002 | Joao | 707/200 |
| 2002/0120650 A1* | 8/2002 | d'Aquin | 707/513 |
| 2002/0138520 A1* | 9/2002 | Wakai et al. | 707/517 |
| 2002/0188527 A1* | 12/2002 | Dillard et al. | 705/27 |
| 2002/0198905 A1* | 12/2002 | Tabatabai et al. | 707/501.1 |
| 2003/0001379 A1* | 1/2003 | Dixon et al. | 283/52 |
| 2003/0018527 A1* | 1/2003 | Filepp et al. | 705/14 |
| 2003/0037340 A1* | 2/2003 | Devara et al. | 725/110 |
| 2003/0065739 A1* | 4/2003 | Shnier | 709/217 |
| 2003/0069747 A1* | 4/2003 | Strothmann et al. | 705/1 |
| 2003/0076277 A1* | 4/2003 | Muramatsu et al. | 345/1.1 |
| 2003/0118979 A1* | 6/2003 | Axelrod | 434/365 |
| 2003/0191653 A1* | 10/2003 | Birnbaum et al. | 705/1 |
| 2003/0208560 A1* | 11/2003 | Inoue et al. | 709/219 |
| 2004/0001087 A1* | 1/2004 | Warmus et al. | 345/745 |
| 2004/0003344 A1* | 1/2004 | Lai et al. | 715/501.1 |
| 2004/0052543 A1* | 3/2004 | Kato | 399/81 |
| 2004/0073483 A1* | 4/2004 | Cohen et al. | 705/14 |
| 2004/0140975 A1* | 7/2004 | Saito et al. | 345/418 |
| 2004/0163039 A1* | 8/2004 | Gorman | 715/505 |
| 2004/0189696 A1* | 9/2004 | Shirriff | 345/738 |
| 2004/0205646 A1* | 10/2004 | Sachs et al. | 715/530 |
| 2005/0097160 A1* | 5/2005 | Stob | 709/200 |
| 2005/0108174 A1* | 5/2005 | DeTreville | 705/57 |
| 2005/0108626 A1* | 5/2005 | Ong | 715/511 |
| 2006/0101323 A1* | 5/2006 | Satyavolu | 715/501.1 |
| 2006/0136399 A1* | 6/2006 | Conwell et al. | 707/3 |
| 2007/0201702 A1* | 8/2007 | Hendricks et al. | 380/282 |

OTHER PUBLICATIONS

Rauch et al., Enabling the Book Metaphor fro the World Wide Web: Dissemintaing on-line Information as Dynamic Web Documents, IEEE Jun. 1997, pp. 111-128.*

Li et al., Integrated System for Developping Intelligent Electronic Standards Book with Internet Capability, IEEE 1999, pp. 115-121.*

Hook et al., Data Consistency Mechanisms to Support Distributed Simulation, Google 1995, pp. 1-10.*

Birk et al., Using Direction and Elapsed-time Information to Reduce the Wireless Cost of Locating Mobile Units in Cellular Networks, Google 1995, pp. 403-412.*

* cited by examiner

FIG. 7

| COMMAND | DEFINITION |
|---|---|
| GetInfo | GET INFORMATION |
| ContentRef | REFER TO FILE INDICATED BY PREDETERMINED ID |
| condT | DETERMINE WHETHER OR NOT CONDITION INCLUDED IN ATTRIBUTE IS TRUE |
| condF | DETERMINE WHETHER OR NOT CONDITION INCLUDED IN ATTRIBUTE IS FALSE |
| GetFile | SPECIFY INFORMATION REQUIRED TO GET/SAVE INFORMATION |

FIG. 8

| ATTRIBUTE VALUE | DEFINITION |
| --- | --- |
| Type | SPECIFY TYPE OF CONDITION (TIME, DATE, POSITION, etc.) |
| On | WHEN "CONDITION" IS SATISFIED |
| From | SUBSEQUENT TO "CONDITION" |
| Passed | WHEN "PERIOD" HAS ELAPSED |
| To | UPTO "CONDITION" |
| href | FILE OBTAINING SOURCE |
| FileName | FILENAME OF DOWNLOADED FILE |
| RefbookID | ID OF CONTENT FILE TO BE REFERENCED |
| replace | DATA TO BE DISPLAYED WHEN FILE SPECIFIED BY ID WAS NOT DETECTED |
| action | INPUT OPERATION FOR DISPLAYING FILE SPECIFIED BY ID |
| icon | SPECIFY ICON TO BE DISPLAYED TO RECEIVE ACTION |

FIG. 9

| DESCRIBED DATA | DESCRIPTION STYLE | | DIFINITION |
|---|---|---|---|
| ABSOLUTE DATE | YYYY/MM/DD | 2001/01/01 | JAN. 1, 2001 |
| ABSOLUTE TIME | HH:MM (:SS) | 13:15 | 13:15 |
| EVERY | <MONTH INFORMATION>MMm | 05m | EVERY MAY |
| | <DAY INFORMATION>DDd | 10d | EVERY 10th DAY |
| DAY | "SUN""MON""TUE""WED""THU""FRY""SAT" | | SUN TO SAT |

FIG. 21

```
<BookID>00000001</BookID>..
 . . . . .
 . . . . .
<Pid="1">ISO/IEC 10646 USES AT MOST
4 BYTES (BASIC MULTILINGUAL PLANE,
GROUP, AND PLANE) TO ASSIGN NUMBER
TO EACH CHARACTER.
```

GLOSSARY

```
 . . . . .
<P>IN XML, <ContentRef RefbookID="00000001#1"
action2="click" icon="content" show="popup"
popuppos="Under">ISO/IEC 10646</ContentRef>
STANDARD IS ADOPTED. <P>
 . . . . .
```

REFERENCE BOOK

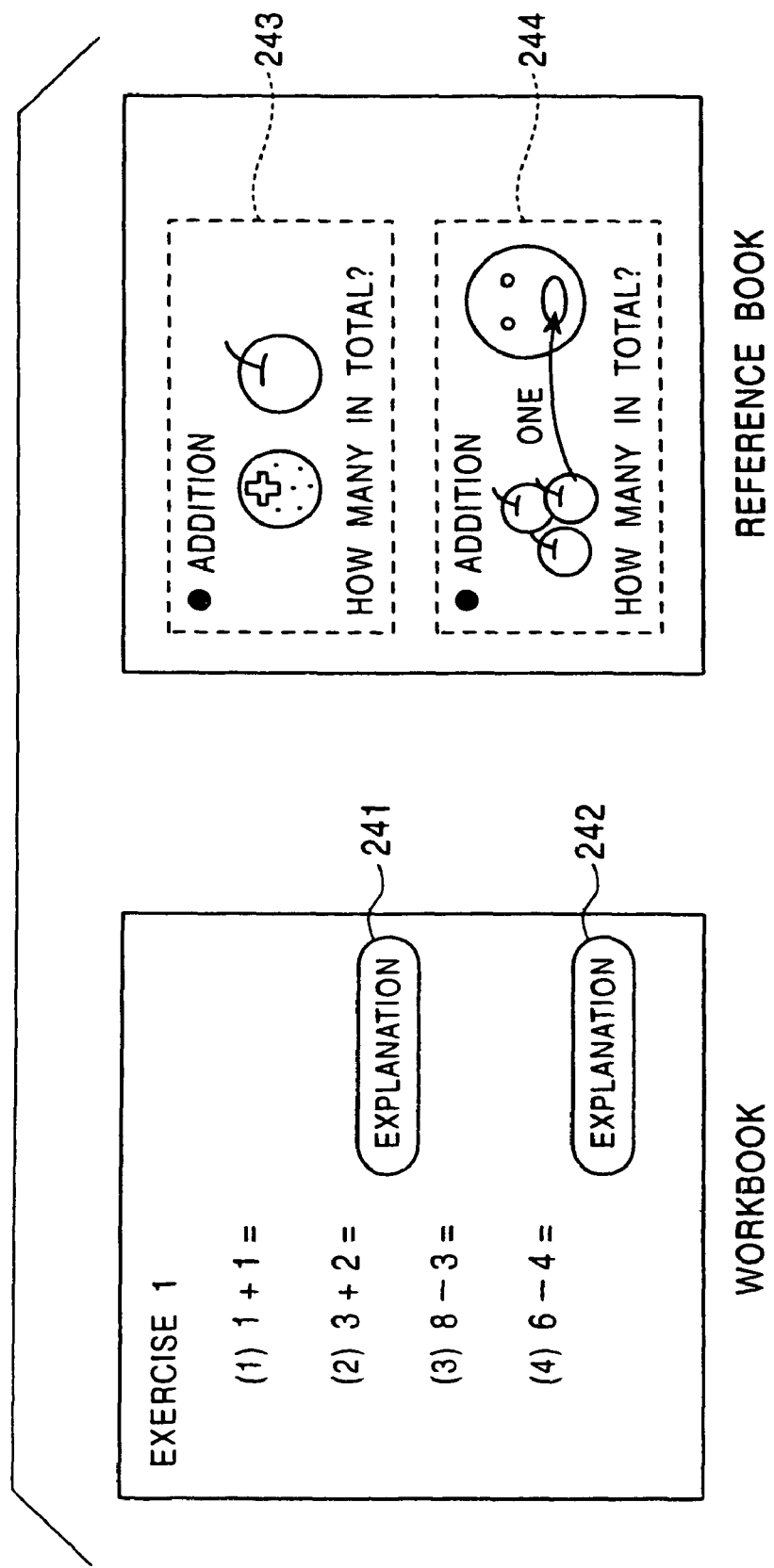

INFORMATION PROCESSING APPARATUS, INFORMATION PROCESSING METHOD, RECORDING MEDIUM, AND PROGRAM

BACKGROUND OF THE INVENTION

1. Field of the Invention

The present invention relates to information processing apparatuses, information processing methods, recording media, and programs, and more particularly relates to an information processing apparatus, an information processing method, a recording medium, and a program suitable for use in reading electronic books (hereinafter referred to as e-books).

2. Description of the Related Art

Hitherto, publishing has been done using paper as a primary medium, such as books, newspaper, and magazines. Recently, publishing using media other than paper, namely, electronic publishing (hereinafter referred to as e-publishing), has become widespread as computers have advanced, the use thereof has been expanded, and the network infrastructure has been developed.

In electronic publications (hereinafter referred to as e-publications) or in e-books, books that used to be printed on paper and published are digitized. Digital data includes text, images, audio data, and video data. A user can download an e-book from a predetermined web server through the Internet and store the downloaded e-book in a predetermined storage medium, a personal computer, or a predetermined player. Alternatively, the user can purchase, for example, a CD-ROM (Compact Disk Read Only Memory) that has recorded therein beforehand an e-book, thus allowing the user to read the e-book. The user can use a PC or a predetermined player in which e-book data is recorded or a recording medium having e-book data recorded therein is loaded to play the e-book.

In e-books, a link is placed at a predetermined word. When the user selects the link, the display screen jumps to a related portion of the same file, or alternatively, another file for another related book is opened and displayed on the display screen.

In e-books downloaded through the Internet or distributed using recording media, when a revised version is put on sale, the entire data for the revised version needs to be downloaded or a recording medium having the revised version recorded therein needs to be purchased.

Although technology has been developed to display predetermined data for another file when a link included in a file is selected, thus allowing a user to reference a plurality of related books, no technology has been developed to simultaneously display all pieces of related information on one page.

In other words, technology related to e-publication is based on replacing the paper medium by the electronic medium, in which searching and linking technology is used. Therefore, although e-publication uses digital data, the advantages of digital data are not fully utilized.

SUMMARY OF THE INVENTION

In view of the foregoing circumstances, it is an object of the present invention to provide an e-book which effectively utilizes the characteristics of digital data.

An information processing apparatus of the present invention includes an output unit for outputting information; a first recording unit for recording first information for causing the output unit to output predetermined information; an analysis unit for analyzing the first information, which is recorded by the first recording unit; a determination unit for determining whether or not to obtain second information, which is referenced by the first information, in accordance with the analysis result by the analysis unit; an obtaining unit for obtaining the second information in accordance with the determination result by the determination unit; a second recording unit for recording the second information, which is obtained by the obtaining unit; and a generation unit for generating third information, which is output from the output unit, in accordance with the analysis result by the analysis unit. The first information includes fourth information indicating a condition for obtaining the second information by the obtaining unit. The determination unit determines whether or not the condition for obtaining the second information is satisfied on the basis of the fourth information. The obtaining unit obtains the second information when it is determined by the determination unit that the condition for obtaining the second information is satisfied.

The fourth information may include any one of conditions relating to date, period, and position.

The first information may further include fifth information relating to obtaining the second information. When the fifth information includes a storage location of the second information and when the storage location stores a plurality of pieces of second information, the generation unit may generate the third information to include the plurality of pieces of second information, which are switched and output at predetermined intervals.

The second recording unit may set a unique filename for each one of the plurality of pieces of second information and may record the second information.

An information processing method of the present invention includes an output control step of controlling outputting information; a first recording control step of controlling recording first information for controlling outputting predetermined information in the output control step; an analysis step of analyzing the first information, the recording thereof being controlled in the first recording control step; a determination step of determining whether or not to obtain second information, which is referenced by the first information, in accordance with the analysis result obtained in the analysis step; an obtaining step of obtaining the second information in accordance with the determination result obtained in the determination step; a second recording control step of controlling recording the second information, which is obtained in the obtaining step; and a generation step of generating third information, the outputting thereof being controlled in the output control step, in accordance with the analysis result obtained in the analysis step. The first information includes fourth information indicating a condition for obtaining the second information in the obtaining step. It is determined in the determination step whether or not the condition for obtaining the second information is satisfied on the basis of the fourth information. When it is determined in the determination step that the condition for obtaining the second information is satisfied, the second information is obtained in the obtaining step.

A program recorded in a recording medium of the present invention includes an output control step of controlling outputting information; a first recording control step of controlling recording first information for controlling outputting predetermined information in the output control step; an analysis step of analyzing the first information, the recording thereof being controlled in the first recording control step; a determination step of determining whether or not to obtain second information, which is referenced by the first information, in accordance with the analysis result obtained in the analysis step; an obtaining step of obtaining the second information in accordance with the determination result obtained in the determination step; a second recording control step of controlling recording the second information, which is obtained in the obtaining step; and a generation step of generating third information, the outputting thereof being controlled in the output control step, in accordance with the analysis result obtained in the analysis step. The first information includes fourth information indicating a condition for obtaining the second information in the obtaining step. It is determined in the determination step whether or not the condition for obtaining the second information is satisfied on the basis of the fourth information. When it is determined in the determination step that the condition for obtaining the second information is satisfied, the second information is obtained in the obtaining step.

A program of the present invention includes an output control step of controlling outputting information; a first recording control step of controlling recording first information for controlling outputting predetermined information in the output control step; an analysis step of analyzing the first information, the recording thereof being controlled in the first recording control step; a determination step of determining whether or not to obtain second information, which is referenced by the first information, in accordance with the analysis result obtained in the analysis step; an obtaining step of obtaining the second information in accordance with the determination result obtained in the determination step; a second recording control step of controlling recording the second information, which is obtained in the obtaining step; and a generation step of generating third information, the outputting thereof being controlled in the output control step, in accordance with the analysis result obtained in the analysis step. The first information includes fourth information indicating a condition for obtaining the second information in the obtaining step. It is determined in the determination step whether or not the condition for obtaining the second information is satisfied on the basis of the fourth information. When it is determined in the determination step that the condition for obtaining the second information is satisfied, the second information is obtained in the obtaining step.

According to an information processing apparatus, an information processing method, and a program of the present invention, first information for outputting predetermined information is recorded. The recorded first information is analyzed. It is determined whether or not to obtain second information, which is referenced by the first information, in accordance with the analysis result. The second information is obtained in accordance with the determination result. The obtained second information is recorded. Third information to be output is generated in accordance with the analysis result. The first information includes fourth information indicating a condition for obtaining the second information. It is determined whether or not the condition for obtaining the second information is satisfied on the basis of the fourth information. The second information is obtained when it is determined that the condition for obtaining the second information is satisfied. Accordingly, a condition for obtaining information can be set in detail, and an e-book of high added value can be provided.

BRIEF DESCRIPTION OF THE DRAWINGS

FIG. 7 is an illustration of tags;

FIG. 8 is another illustration of tags;

FIG. 9 is another illustration of tags;

FIG. 21 illustrates a reference book and a glossary to which the present invention is applied;

FIG. 23 illustrates a workbook and a reference book to which the present invention.

DESCRIPTION OF THE PREFERRED EMBODIMENTS

With reference to the accompanying drawings, the present invention will become clear from the following description of embodiments of the present invention.

Figure 1:
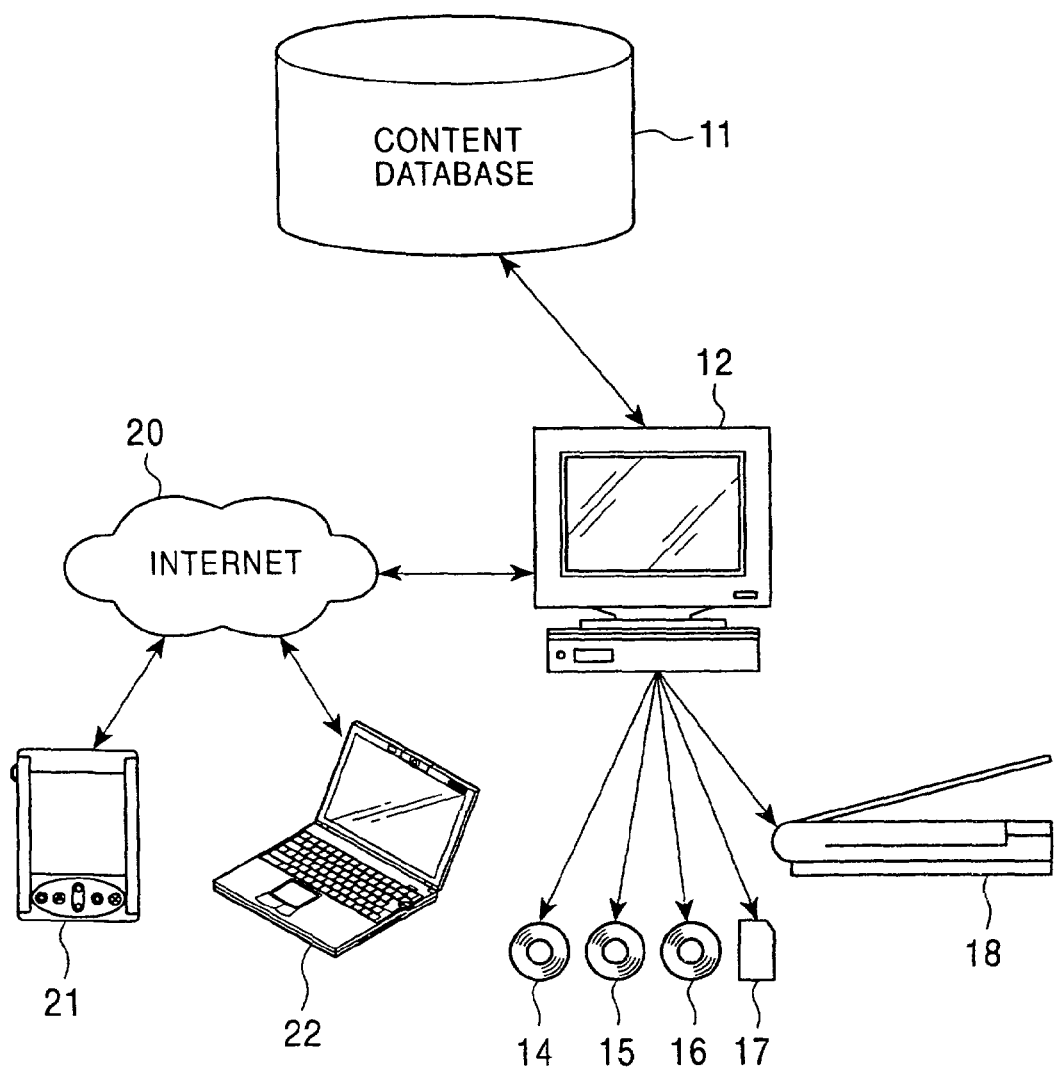
FIG. 1 illustrates an e-book providing system to which the present invention is applied.

Referring to FIG. 1, an e-book providing system to which the present invention is applied will now be described.

A content database 11 records content data for displaying an e-book and object data relating to content in a predetermined file format.

Content data is written in a markup language, such as XML (extensible Markup Language), and includes information to be played or displayed as the e-book, commands for playing or displaying the e-book, and, if necessary, statements for referencing other content data or object data. The XML is a markup language capable of defining not only a fixed markup method, such as HTML (HyperText Markup Language), but also a unique markup method and can describe the document structure in a simple format. Since XML can uniquely define tags, data can be written using a structure understandable to human beings. Also, data can be constructed flexibly.

Object data is data that does not include a statement, for example, plain text data, image data, audio data, and video data. The object data is played or displayed when being referenced by the content data.

A personal computer 12 reads content data or object data, which is written in XML, from the content database 11 and outputs the content data or the object data forming the e-book to various recording media, such as a magnetic disk 14, an optical disk 15, a magneto-optical disk 16, or a semiconductor memory 17 (including a memory stick (registered trademark)) or an internal memory of an e-book player 18, which is a dedicated player, and hence the content data or the object data can be recorded.

The personal computer 12 downloads content data or object data to a user's PDA 21 or a personal computer 22 through the Internet 20.

Although one personal computer 12 is displayed, a plurality of personal computers 12 can be provided. When there is a plurality of publishers of e-publications, personal computers under management of the corresponding publishers are connected to the Internet 20.

Various recording media, such as the magnetic disk 15, the optical disk 15, the magneto-optical disk 16, or the semiconductor memory 17, can be installed in the PDA 21, the personal computer 22, or the e-book player 18 owned by an individual user.

The PDA 21 or the personal computer 22 displays, on a display unit such as a display or a touchpanel, an e-book formed by content data or object data which is downloaded from the personal computer 12 through the Internet 20 and which is recorded in an internal memory or an e-book formed by object data or content data which is recorded in an installed recording medium (e.g., the magnetic disk 14, the optical disk 15, the magneto-optical disk 16, or the semiconductor memory 17).

The e-book player 18 displays, on a display panel, an e-book formed by content data or object data which is recorded therein beforehand or which is recorded therein by user processing or an e-book which is formed by content data or object data recorded in an installed recording medium. Also, the e-book player 18 can download content data or object data from the personal computer 12 through the Internet 20.

Figure 2:
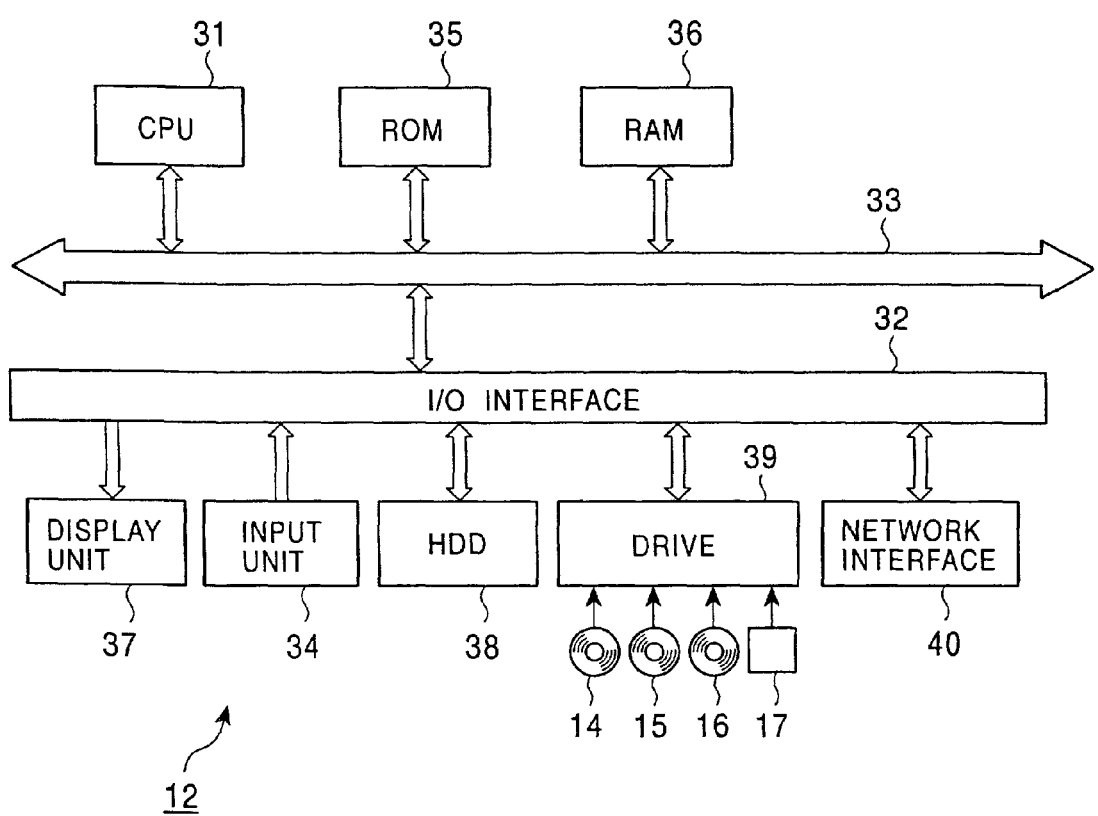
FIG. 2 is a block diagram showing the configuration of a personal computer shown in FIG. 1.

FIG. 2 shows the configuration of the personal computer 12 shown in FIG. 1.

A CPU (Central Processing Unit) 31 receives signals corresponding to various commands input by a user using an input unit 34 through an input/output (I/O) interface 32 and an internal bus 33, receives a control signal transmitted from another personal computer (e.g., the personal computer 22) through a network interface 40, and performs various processes based on the input signals. A ROM (Read Only Memory) 35 stores a program used by the CPU 31 and basically-fixed data of parameters for arithmetic processing. A RAM (Random Access Memory) 36 stores a program executed by the CPU 31 and variable parameters that appropriately change in accordance with the execution of the program. The CPU 31, the ROM 35, and the RAM 36 are interconnected through the internal bus 33.

The internal bus 33 is also connected to the I/O interface 32. The input unit 34 is formed by, for example, a keyboard, a touchpad, a jog dial, or a mouse and is operated when the user wants to input various commands to the CPU 31. A display unit 37 is formed by, for example, a CRT (Cathode Ray Tube) or an LCD (Liquid Crystal Display) and displays various information using text or images.

An HDD (Hard Disk Drive) 38 drives a hard disk and causes the hard disk to record or play a program executed by the CPU 31 or information. If necessary, the magnetic disk 14, the optical disk 15, the magneto-optical disk 16, or the semiconductor memory 17 is installed in a drive 39, and hence data can be exchanged.

The network interface 40 is connected to the e-book player 18 through a predetermined cable and exchanges information with the e-book player 18. Also the network interface 40 accesses the content database 11, searches the content database 11 for necessary information, and reads the necessary information. Also the network interface 40 registers new data or updates registered data.

The components from the input unit 34 to the network interface 40 are connected to the CPU 31 through the I/O interface 32 and the internal bus 33.

Since the configuration of the personal computer 22 owned by the user, which is connected to the personal computer 12 through the Internet 20, is basically the same as that of the personal computer 12 described by referring to FIG. 2, a description thereof is omitted.

Figure 3:
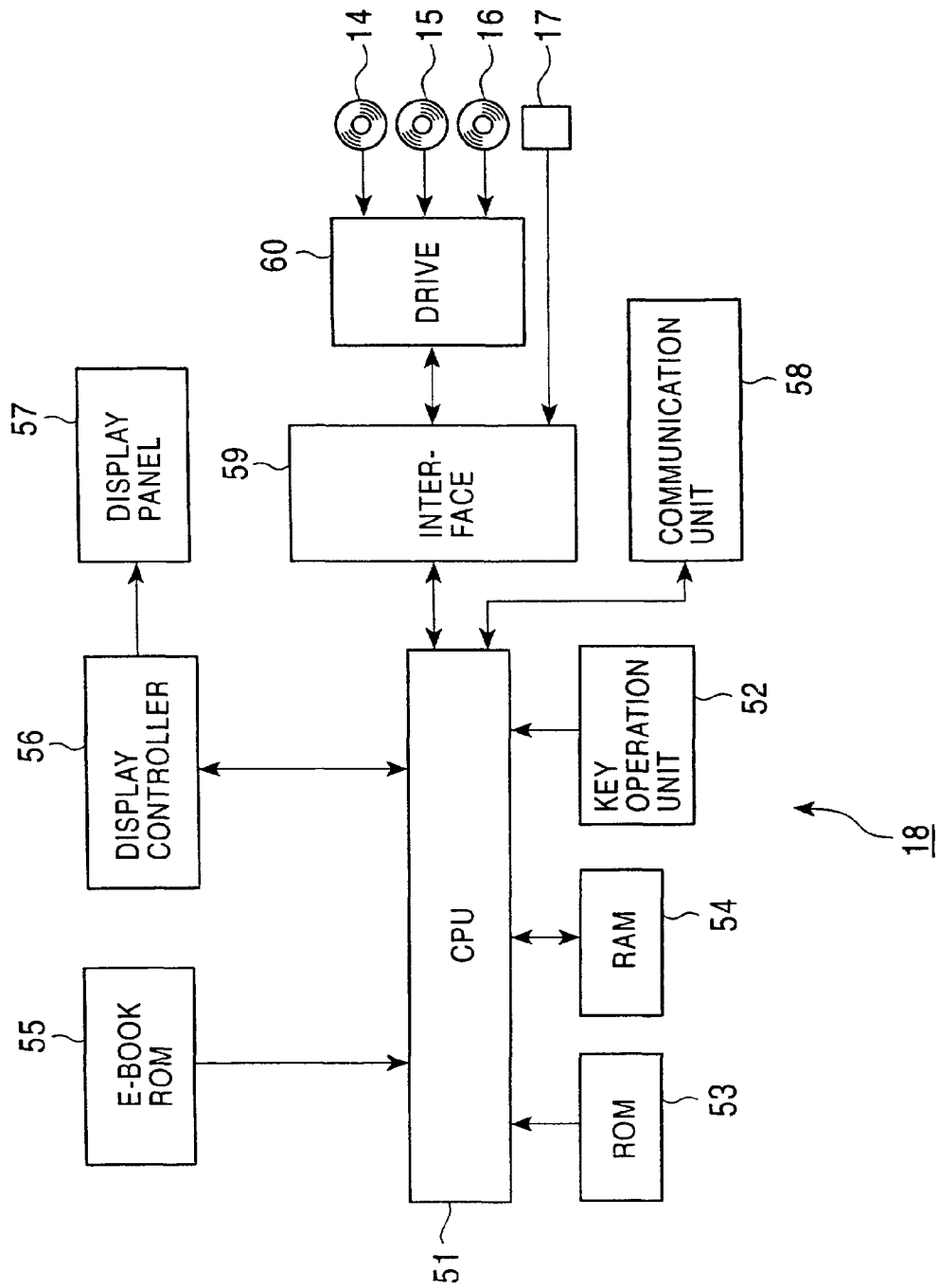
FIG. 3 is a block diagram showing the configuration of an e-book player shown in FIG. 1.

FIG. 3 shows the configuration of the e-book player 18 shown in FIG. 1.

A CPU 51 performs various processes based on signals corresponding to various commands input by the user using a key operation unit 52 and a control signal input through a communication unit 58. A ROM 53 stores a program used by the CPU 51 and basically-fixed data of parameters for arithmetic processing. A RAM 54 stores a program executed by the CPU 51 and variable parameters which appropriately change in accordance with the execution of the program.

An e-book ROM 55 records content data or object data which is input from the personal computer 12 or which is downloaded from the personal computer 12 through the Internet 20 and the communication unit 58.

A display controller 56 displays, under the control of the CPU 51, various information using text or images on a display panel 57. The display panel 57 is formed by, for example, a CRT or an LCD. Under the control of the display controller 56, the display panel 57 displays various information using text or images.

A drive 60 and the semiconductor memory 17 are connected to an interface 59, thereby exchanging data. If necessary, the magnetic disk 14, the optical disk 15, or the magneto-optical disk 16 is installed in the drive 60, and hence data can be exchanged.

The communication unit 58 is connected to the personal computer 12. To exchange information, the communication unit 58 accesses the personal computer 12 through the Internet 20, searches the personal computer 12 for necessary information, and downloads the necessary information.

Figure 4:
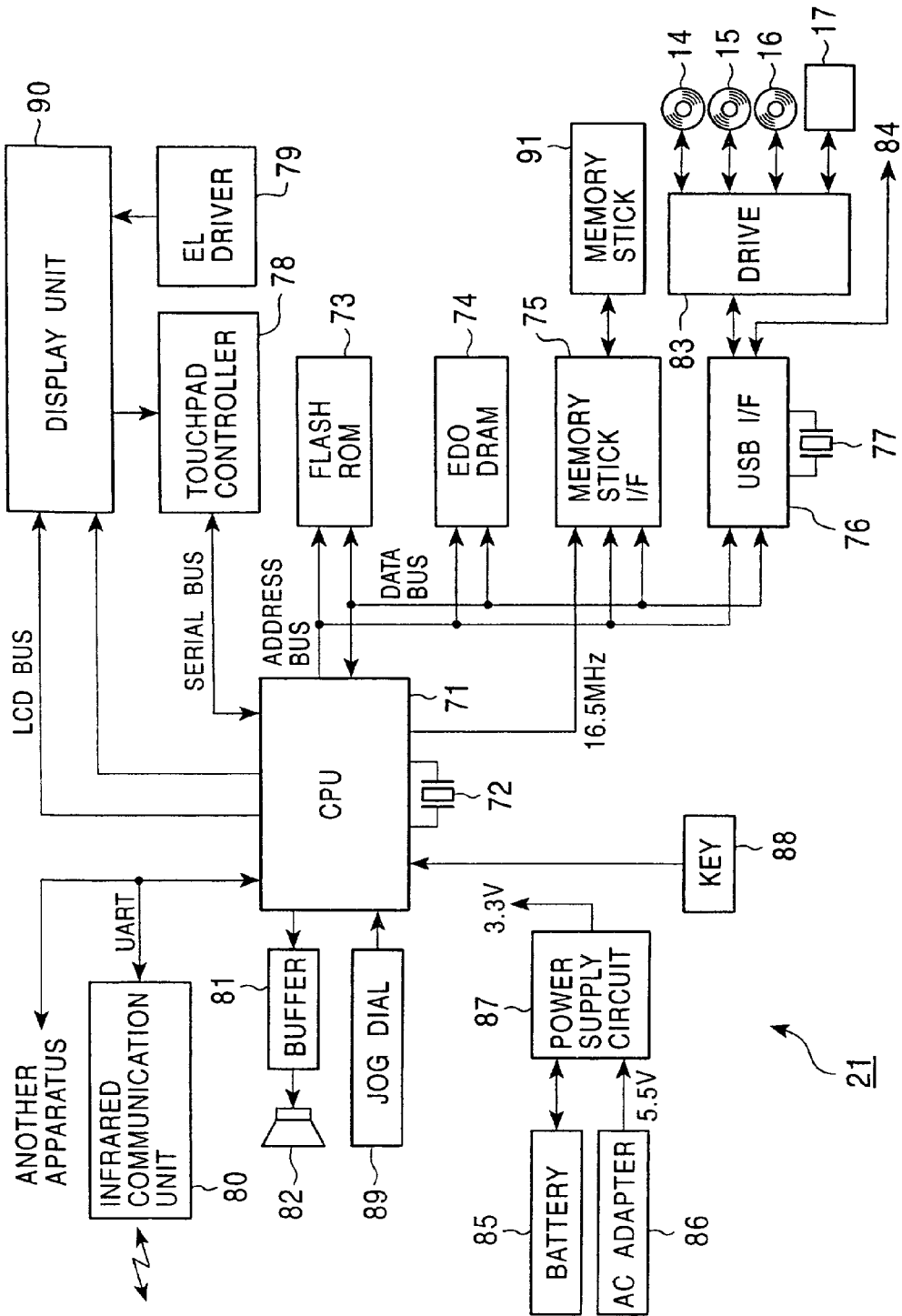
FIG. 4 is a block diagram showing the configuration of a personal digital assistant (PDA)

Referring to FIG. 4, the internal configuration of the PDA 21 will now be described.

A CPU 71 performs an operating system or various programs, such as a developed application program, which are stored in a flash ROM 73 or an EDO DRAM (Extended Data Out Dynamic Random Access Memory) 74 in synchronization with a clock signal supplied from an oscillator 72.

The flash ROM 73 is formed by a flash memory, which is one type of EEPROM (Electrically Erasable Programmable Read Only Memory). In general, the flash ROM 73 stores a program used by the CPU 71 and basically-fixed data of parameters for arithmetic processing. The EDO DRAM 74 stores a program executed by the CPU 71 and variable parameters which appropriately change in accordance with the execution of the program.

A memory stick interface 75 reads data from a memory stick 91 installed in the PDA 21 and writes data supplied from the CPU 71 to the memory stick 91.

In synchronization with a clock signal supplied from the oscillator 77, an USB (Universal Serial Bus) interface 76 receives data or a program from a drive 83, which is a connected USB device, and supplies data supplied from the CPU 71 to the drive 83. In synchronization with a clock signal supplied from the oscillator 77, the USB interface 76 receives data or a program from a cradle 84, which is a connected USB device, and supplies data supplied from the CPU 71 to the cradle 84.

The cradle 84 is a docking station for performing data synchronization by connecting, by wire, the PDA 21 and a personal computer and by performing so-called "hot sync" processing.

The drive 83 is also connected to the USB interface 76. The drive 83 reads data or a program recorded in the installed magnetic disk 14, the optical disk 15, the magneto-optical disk 16, or the semiconductor memory 17 and supplies the data or the program through the USB interface 76 to the CPU 71 or the EDO DRAM 74 connected thereto. Also the drive 83 records data or a program supplied from the CPU 71 in the installed magnetic disk 14, the optical disk 15, the magneto-optical disk 16, or the semiconductor memory 17.

The PDA 21 can establish a connection with a cellular phone or a PHS (Personal Handyphone System), thus allowing the PDA 21 to access the personal computer 12 through the Internet 20.

The flash ROM 73, the EDO DRAM 74, the memory stick interface 75, and the USB interface 76 are connected to the CPU 71 through an address bus and a data bus.

A display unit 90 receives data from the CPU 71 through an LCD bus and displays an image or a character corresponding to the received data. When a touchpad provided in the upper portion of the display unit 90 is operated, a touchpad controller 78 receives data corresponding to the operation (e.g., data indicating the coordinates of a touched position) from the display unit 90 and supplies a signal corresponding to the received data to the CPU 71 through a serial bus.

An electroluminescence (EL) driver 79 activates an EL device provided at the back of the LCD of the display unit 90 and controls the brightness of the display unit 90.

An infrared communication unit 80 transmits data received from the CPU 71 through the medium of infrared radiation to another apparatus (not shown) through a universal asynchronous receiver-transmitter (UART). The infrared communication unit 80 also receives data through the medium of infrared radiation transmitted from another apparatus and supplies the received data to the CPU 71. In other words, the PDA 21 can communicate with another apparatus through the UART.

An audio playing unit 82 is formed by a speaker and a demodulator circuit for demodulating audio data. The audio playing unit 82 demodulates pre-stored audio data or audio data received through the Internet 20, plays the audio data, and outputs sound. For example, the audio playing unit 82 plays audio data supplied from the CPU 71 through a buffer 81 and outputs sound corresponding to the data.

A key 88 is formed by, for example, an input key. The key 88 is operated by the user when the user wants to input various commands to the CPU 71.

A jog dial 89 supplies to the CPU 71 data corresponding to an operation in which the jog dial 89 is rotated or pressed against a main body.

A power supply circuit 87 transduces a power supply voltage supplied from a battery 85 attached thereto or an AC (Alternating Current) adapter 86 connected thereto and supplies power to the components from the CPU 71 to the audio playing unit 82.

Figure 5:
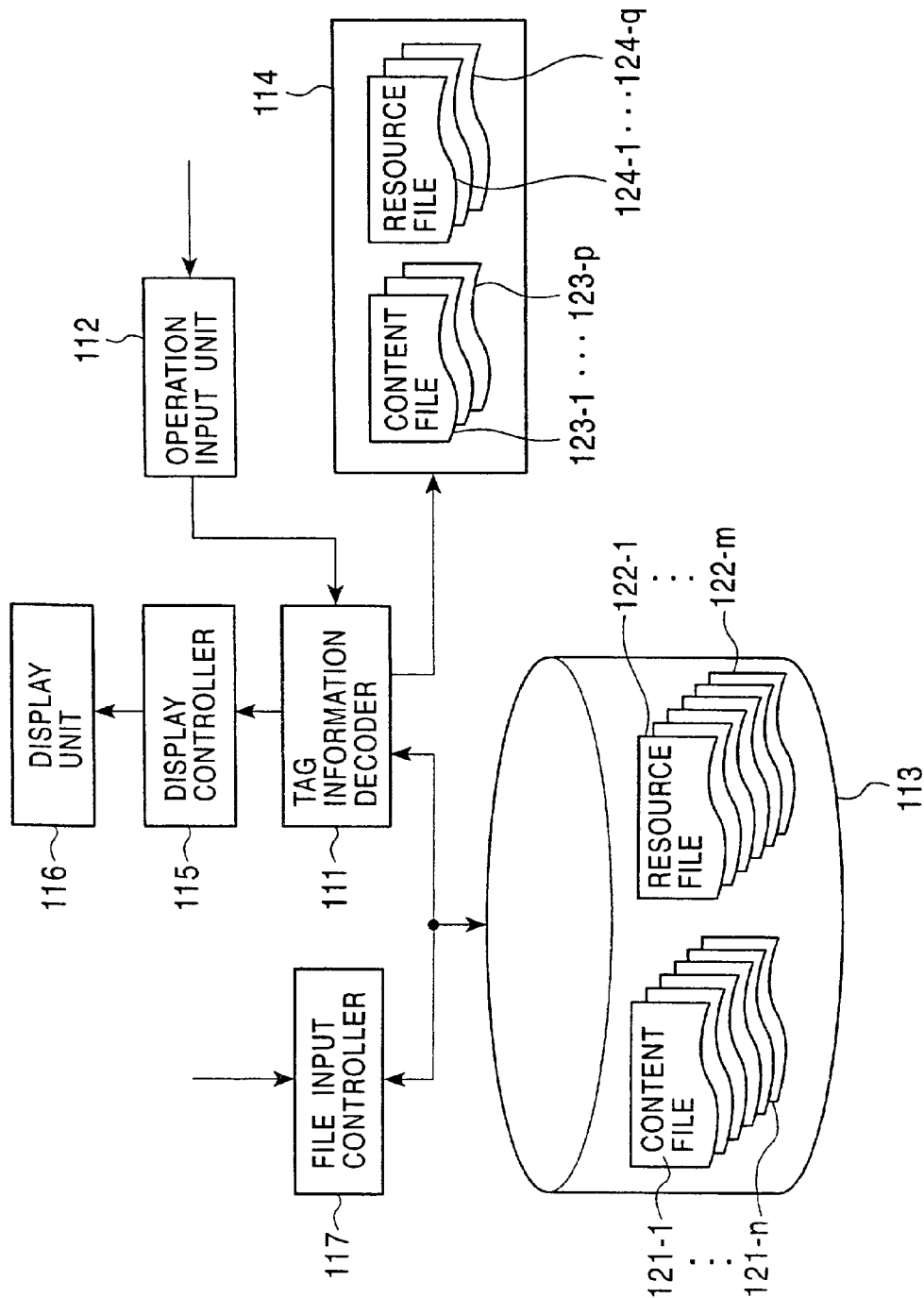
FIG. 5 is a functional block diagram for performing processing to display a content file.

Referring to FIG. 5, functional blocks in a case in which an e-book is played by, for example, the e-book player 18, the PDA 21, or the personal computer 22 will now be discussed.

A tag information decoder 111 selectively reads a content file desired by a user from among content files 121-1 to 121-n recorded in a file recording unit 113 or content files 123-1 to 123-p recorded in an external recording unit 114 in accordance with information corresponding to user operation input from an operation input unit 112 and decodes tag information. The tag information decoder 111 also controls the recording of a new content file or a new resource file into the file recording unit 113, which is input through a file input controller 117.

A resource file is a file referenced by a content file and basically corresponds to the foregoing object file. Tags can be included in the resource file. A tag for referencing another content file may be included in the content file.

Specifically, the tag information decoder 111 analyzes tags in the selectively read content file of the content files 121-1 to 121-n or 123-1 to 123-p. If necessary, the tag information decoder 111 reads resource files 122-1 to 122-m or 124-1 to 124-q or a content file other than the first-selected content file, generates display data for the e-book, and outputs the display data to a display controller 115.

The display controller 115 receives the e-book display data and controls a display unit 116 to display the input e-book display data.

The file recording unit 113 records, for example, data downloaded through the Internet 20 or data copied from various recording media. The file recording unit 113 records the content files 121-1 to 121-n and the resource files 122-1 to 122-m. The external recording unit 114 corresponds to various recording media, such as the above-described magnetic disk 14, the optical disk 15, the magneto-optical disk 16, or the semiconductor memory 17, or any apparatus capable of recording information. The external recording unit 114 records the content files 123-1 to 123-p and the resource files 124-1 to 124-q.

Hereinafter the content files 121-1 to 121-n are collectively referred to as content files 121 when it is unnecessary to distinguish between the individual content files 121-1 to 121-n. The resource files 122-1 to 122-m are collectively referred to as resource files 122 when it is unnecessary to distinguish between the individual resource files 122-1 to 122-m. The content files 123-1 to 123-p are collectively referred to as content files 123 when it is unnecessary to distinguish between the individual content files 123-1 to 123-p. The resource files 124-1 to 124-q are collectively referred to as resource files 124 when it is unnecessary to distinguish between the individual resource files 124-1 to 124-q.

Figure 6:
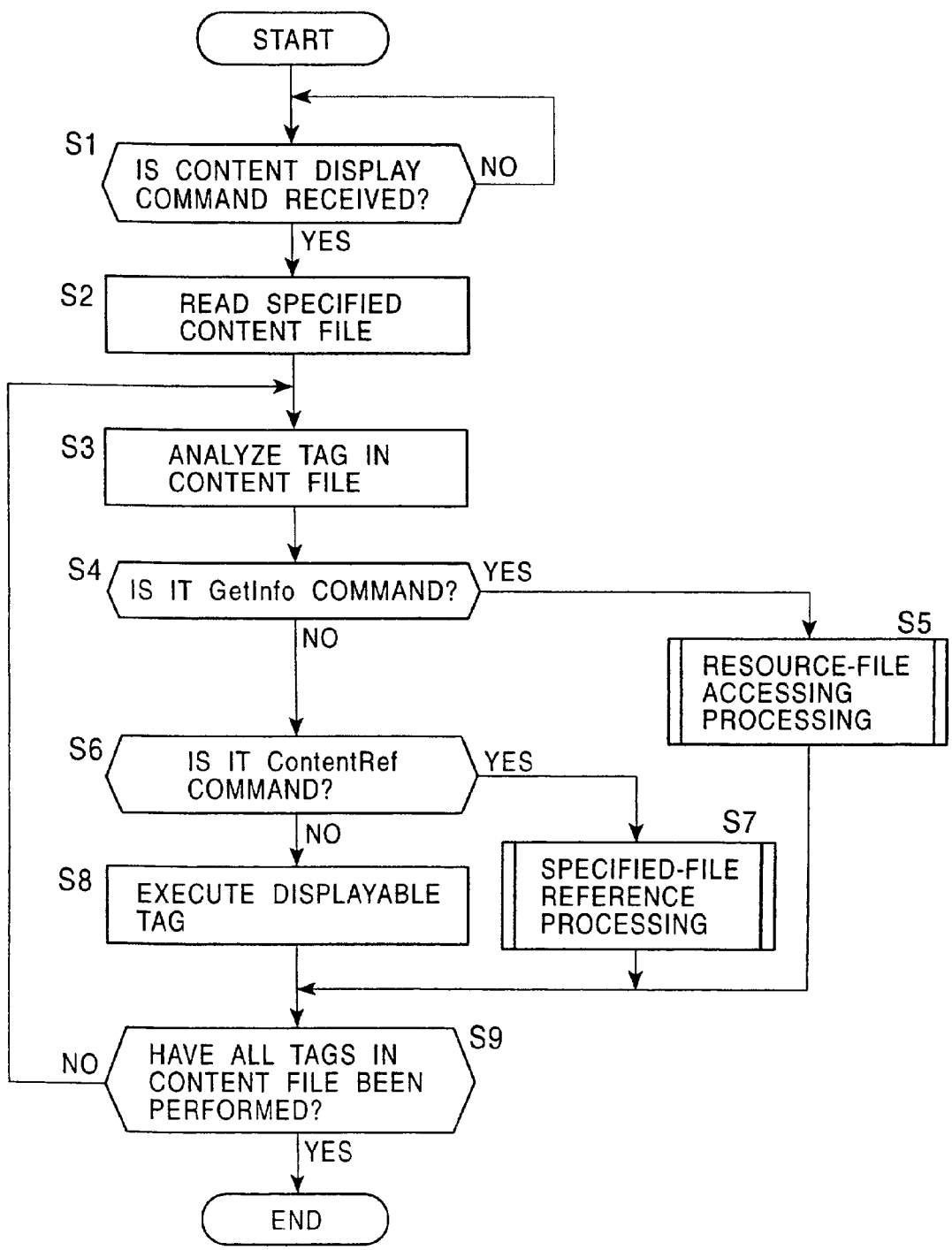
FIG. 6 is a flowchart showing a content-file displaying process.

A content displaying process will now be described by referring to the flowchart shown in FIG. 6.

In step S1, the tag information decoder 111 determines whether or not a content (data corresponding to an e-book) display command from the operation input unit 112 is received, that is, whether or not an e-book read command input by a predetermined operation is received. If it is determined in step S1 that no content display command is received, the processing in step S1 is repeated until it is determined that a content display command is received.

If it is determined in step S1 that a content display command is received, in step S2, the tag information decoder 111 reads the specified content file 121 or 123 from the file recording unit 113 or the external recording unit 114, respectively.

In step S3, the tag information decoder 111 analyzes a tag in the content file 121 or 123 read in step S2. FIGS. 7 to 9 show examples of tags included in the content file 121 or 123.

Referring to FIG. 7, examples of command tags will now be described. GetInfo tag is a command for obtaining and displaying a file in accordance with a subsequent condition command or with a tag specifying a source for obtaining information. ContentRef tag is a command for obtaining and displaying information displayed in a predetermined portion of the content file 121 or 123 in accordance with the content file 121 or 123 specified by subsequent Bookid and in accordance with reference position information.

CondT tag is a condition command for determining whether or not a condition included in the subsequent attribute is true. CondF is a condition command for determining whether or not a condition included in the subsequent attribute is false. CondT tag and CondF tag also determine the number of significant digits of the subsequent attribute data. For example, an absolute date discussed below can be written as YYYY/MM/DD when the absolute date including the day is specified. When only YYYY is included, whether or not the condition is satisfied can be determined only by year information. When the absolute date is written as MM/DD, attribute information thereof is determined as month/day, and whether or not the condition is satisfied is determined accordingly. GetFile tag specifies a source for obtaining information (for example, a URL or an absolute path or a relative path in a personal computer) and the filename of a saved file for saving the obtained information.

Referring to FIG. 8, examples of tags for expressing attribute values will now be described. A Type attribute is included subsequent to condT or condF, which is a condition command. The Type attribute is a tag specifying the type of condition, such as time, date, or position. When position is used as a condition, the current position of the user is determined using GPS (Global Positioning System). An On attribute is included subsequent to the Type attribute. When the On attribute corresponds to (matches) the subsequent "date" information, it is determined that the condition is true (or false).

A Passed attribute is included subsequent to the Type attribute. If the subsequent "period" has elapsed, it is determined that the condition is true (or false). When a predetermined period, such as one month, has passed since information was downloaded (copied) to a corresponding portion, the Passed attribute is used to download a new file or to prevent the downloaded file from being displayed. Accordingly, information subsequent to the Passed attribute is information indicating "period", not "date".

A From attribute is included subsequent to the Type attribute. When the current date is subsequent to "date" information included subsequent to the From attribute, it is determined that the condition is true (false). A To attribute is included subsequent to the Type attribute. When the current date is prior to "date" information included subsequent to the To attribute, it is determined that the condition is true (false).

An href attribute is included subsequent to the GetFile tag. The href attribute specifies the URL of a file obtaining source or an absolute path or a relative path in a personal computer. A FileName attribute is included subsequent to the href attribute. The FileName attribute specifies the filename of an obtained file. A RefbookID attribute is included subsequent to the ContentRef tag. The RefbookID attribute specifies the ID of the content file 121 or 123 to be referenced and, if necessary, a reference destination in the content file. A Replace attribute is included subsequent to the RefbookID attribute. The Replace attribute specifies data to be displayed instead when there is no content file 121 or 123 having the specified ID.

An action attribute is included subsequent to the RefbookID attribute. The action attribute describes the type of operation input received to display the content file 121 or 123 having the specified ID. An icon attribute is included subsequent to the action attribute. The icon attribute specifies an icon to be displayed for receiving an operation input specified by the action attribute.

Referring to FIG. 9, examples of modes of expressions for expressing dates subsequent to On, From, and To, which indicate attributes of a tag, will now be described. An absolute date is specified as YYYY/MM/DD. For example, when the absolute date is specified as 2001/01/01, it indicates Jan. 1, 2001. An absolute time is expressed as HH:MM(:SS). For example, when the absolute time is specified as 13:15, it indicates 13:15 (1:15 PM). In order to express month information indicating an arbitrary month every year, it is specified as MMm. For example, when the month information is specified as 05m, it indicates every May. In order to express day information indicating an arbitrary day every month, it is specified as DDd. For example, when the day information is specified as 10d, it indicates every 10th day. Days of the week are described as "SUN", "MON", "TUE", "WED", "THU", "FRY", and "SAT", which indicate Sunday, Monday, Tuesday, Wednesday, Thursday, Friday, and Saturday, respectively.

In step S4, the tag information decoder 111 determines whether or not a tag included in the content file 121 or 123

Figure 10:
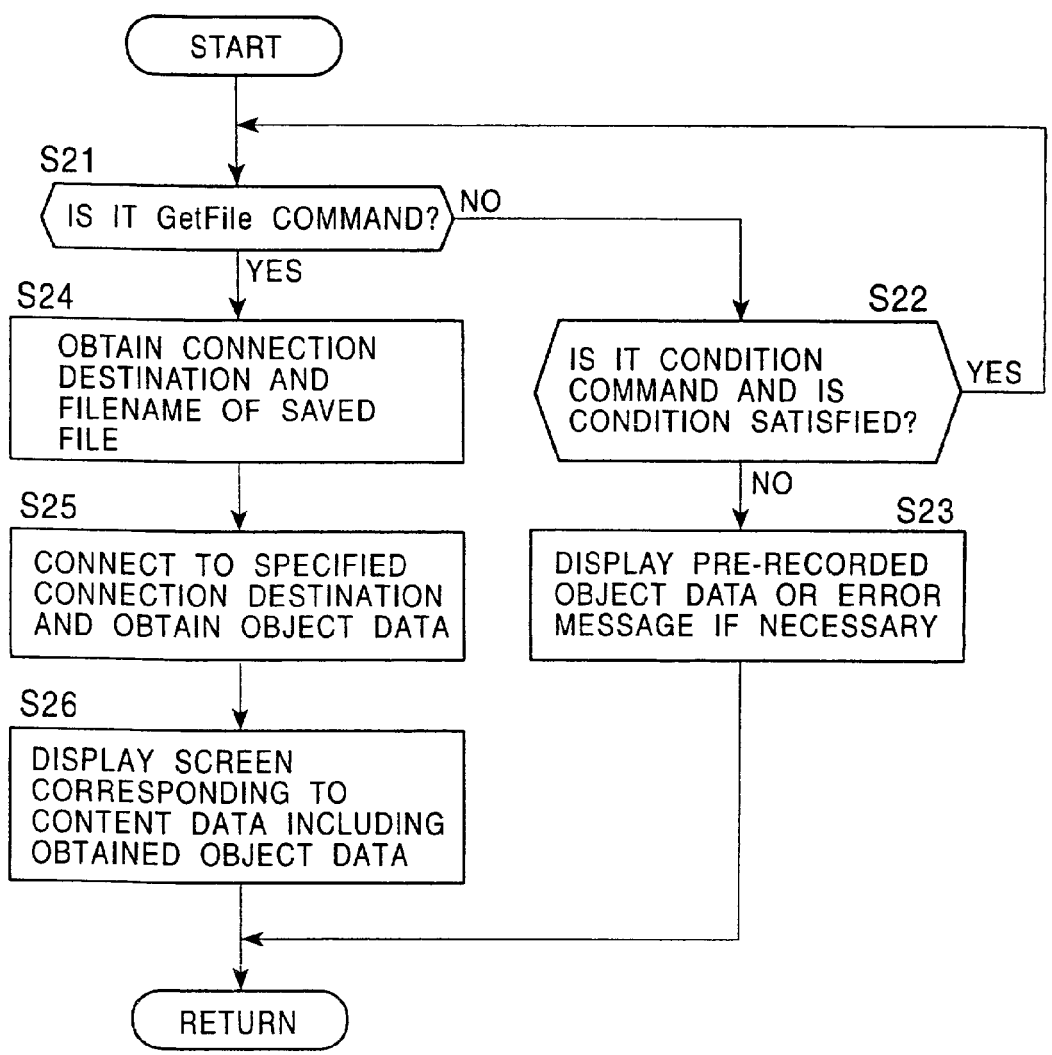
FIG. 10 is a flowchart showing a resource-file accessing process.

If it is determined in step S4 that the tag included in the content file 121 or 123 is a GetInfo command, in step S5, a resource-file accessing process described below with reference to a flowchart shown in FIG. 10 is performed.

If it is determined in step S4 that the tag included in the content file 121 or 123 is not a GetInfo command, in step S6, the tag information decoder 111 determines whether or not the tag included in the content file 121 or 123 is a ContentRef command.

Figure 16:
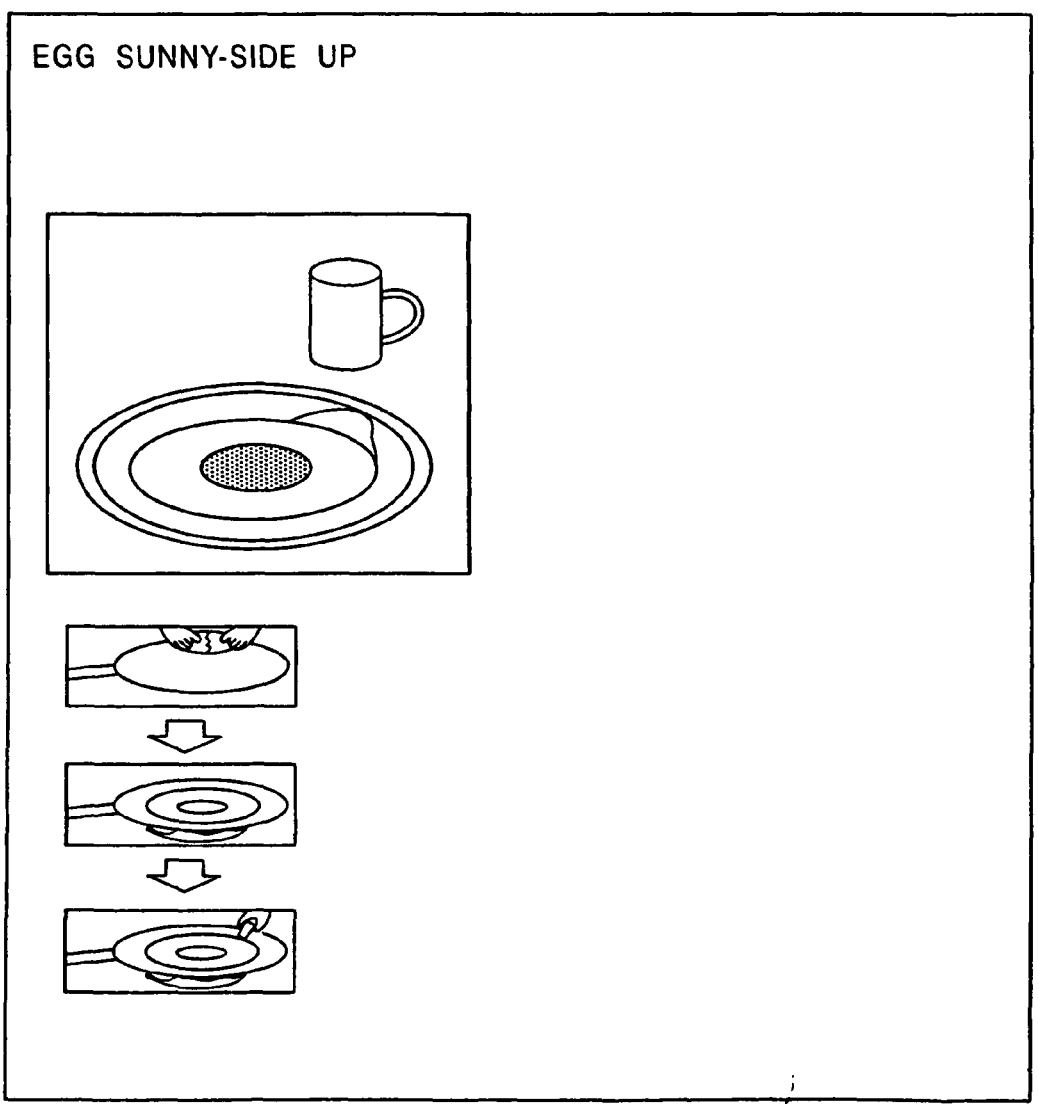
FIG. 16 illustrates the e-book display screen when there is no content to be referenced.

If it is determined in step S6 that the tag included in the content file 121 or 123 is a ContentRef command, in step S7, a specified-file reference process, which will be described with reference to a flowchart shown in FIG. 16, is performed.

If it is determined in step S6 that the tag included in the content file 121 or 123 is not a ContentRef command, in step S8, the tag information decoder 111 executes a displayable tag.

After the processing in steps S5, S7, or S8 is terminated, in step S9, the tag information decoder 111 can determine whether or not all the tags in the content file 121 or 123 have been executed.

If it is determined in step S9 that not all the tags in the content file 121 or 123 have been executed, the process returns to step S3, and the processing from step S3 onward is repeated. If it is determined in step S9 that all the tags in the content file 121 or 123 have been executed, the process is terminated.

Accordingly, the tag information decoder 111 can display the e-book by reading the content file 121 or 123 specified by the user and by analyzing and executing tags in the content file 121 or 123. In accordance with tag commands, if necessary, another content file 121 or 123 or the resource file 122 or 124 is read from a specified location and is displayed as part of the e-book. Hereinafter a method for reading and displaying the primary content file 121 or 123 and the reference destination, i.e., the content file 121 or 123 or the resource file 122 or 124, will now be described in detail.

The resource-file accessing process, which is performed in step S5 in FIG. 6, will now be described by referring to In step S21, the tag information decoder 111 determines whether or not a tag for performing the process is a GetFile command.

If it is determined in step S21 that the tag is not a GetFile command, in step S22, the tag information decoder 111 determines whether or not the tag for performing the process is a condition command, such as condT or condF illustrated in FIG. 7, and whether or not a condition specified by an attribute value illustrated in FIG. 8 is satisfied. If it is determined in step S22 that the tag for performing the process is a condition command, such as condT or condF, and that the condition specified by the attribute value, which is illustrated in FIG. 8, is satisfied, the process returns to step S21, and the processing from step S21 onward is repeated.

If it is determined in step S22 that the tag for performing the process is not a condition command but is, for example, unanalyzable information, or if the tag for performing the process is a condition command though the condition is not satisfied, in step S23, the tag information decoder 111 generates data corresponding to a display screen for displaying, if necessary, pre-recorded object data or an error message and outputs the generated data to the display controller 115. The display controller 115 controls the display unit 116 and causes the display unit 116 to display the display screen corresponding to the data supplied from the tag information decoder 111. The process then returns to step S9 in FIG. 6.

If it is determined in step S21 that the tag for performing the process is a GetFile command, in step S24, the tag information decoder 111 obtains a connection destination and the filename of a saved file for recording a file, which are used for downloading a file to be referenced through the file input controller 117 or for copying a file to be referenced from the external recording unit 114, on the basis of information included in the tag, and for recording the file in the file recording unit 113.

For example, when it is specified that object data be downloaded from a predetermined WWW server, a URL of the corresponding WWW server is included in the GetFile tag. When object data recorded in an externally-connected device or in an internal recording unit is to be referenced, a path to the object data (a suitable path for referencing the object data is selected from an absolute path and a relative path) is specified.

In step S25, the tag information decoder 111 connects to the connection destination specified by the information obtained in step S24, obtains the object data specified by the GetFile tag, and records the object data in the file recording unit 113.

In step S26, the tag information decoder 111 generates display data for displaying a display screen corresponding to content data including the obtained object data (that is, the resource file 122) and outputs the display data to the display controller 115. The display controller 115 controls the display unit 116 to cause the display unit 116 to display a display screen corresponding to the data supplied from the tag information decoder 111. The process then returns to step S9 in FIG. 6.

Figure 11:
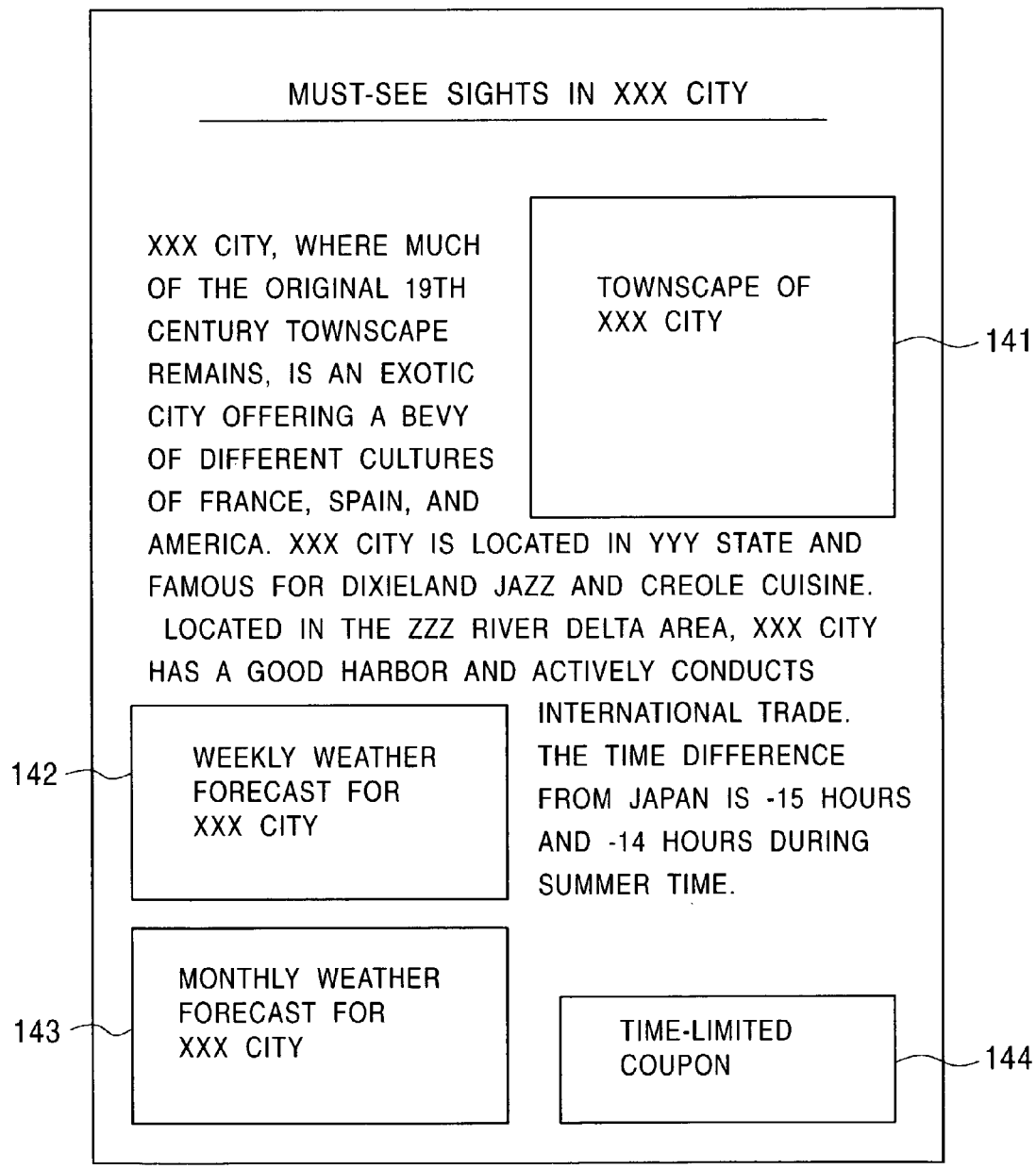
FIG. 11 is an illustration of a guidebook provided as an e-book to which the present invention is applied.

FIG. 11 shows one page of a guidebook (tourist information) provided as an e-book to which the present invention is applied. Preferably the guidebook always describes up-to-date information. On the other hand, the guidebook includes many pieces of substantially unvarying information, such as a description of the history of a corresponding region. If it is attempted to describe in the guidebook every piece of event information relating to festivals and regional events irrespective of time, the total amount of information would increase. In order to reduce the total amount of information, the description of each event needs to be reduced. To prevent such problems, whether or not information is directly described in the content file 121 or 123 or obtained from a specified location is determined depending on whether or not the information needs to be changed according to time.

The page of the guidebook shown in FIG. 11 includes display areas 141 to 144, the display of which is under the control of the resource-file accessing process. Portions other than the display areas 141 to 144 display the same data at any time, which means that text is included in the content data 121 or 123.

A process of displaying the content file 121 or 123, including tags for displaying the page of the guidebook shown in FIG. 11, will now be described, for example, when a townscape image relating to the content data 121 is to be displayed in the display area 141, the image is updated from time to time. Accordingly, the e-book can have added value.

In such a case, a GetFile command following a GetInfo command specifies, subsequent to href, the location of a site storing image data, i.e., http://www.aaa.com/files. Subsequent to FileName=, the filename town.jpg to be given to the downloaded image is specified.

In the tag, only the URL of the site storing the image data is included; no filename of the image data to be downloaded is specified. For example, when a specified connection destination has a plurality of files recorded therein, all the files are downloaded. When a plurality of files is downloaded, filenames are determined so that the individual files can be distinguished by automatically assigning a number to each file, such as Town1.jpg, Town2.jpg, Town3.jpg, etc.

In order to display a weekly weather forecast relating to the content data 121 in the display area 142 and a monthly weather forecast relating to the content data 121 in the display area 143, for example, a condition command condT is included between a GetInfo command and a GetFile command. Data specified by the subsequent GetFile command is obtained only if a condition indicated by the condition command condT is satisfied.

More specifically, it is assumed that <condT Type="day" On="WED"/> is included. When it is Wednesday, a file specified by the URL and filename (http://ww.aaa.com/weth/xxx.txt), which is specified subsequent to href, is downloaded in accordance with the GetFile tag. The downloaded file is stored under the filename WeekWeather.text as the resource file 122 in the file recording unit 113 and is displayed in the display area 142. When it is assumed that <condT Type="day" On="Old/>is specified, a file specified by the URL and filename (http://www.aaa.com/weath/yyy.text), which is specified subsequent to href, is downloaded on the first day every month. The downloaded file is stored under the filename MonthWeather.text as the resource file 122 in the file recording unit 113 and is displayed in the display area 143.

Figure 13:
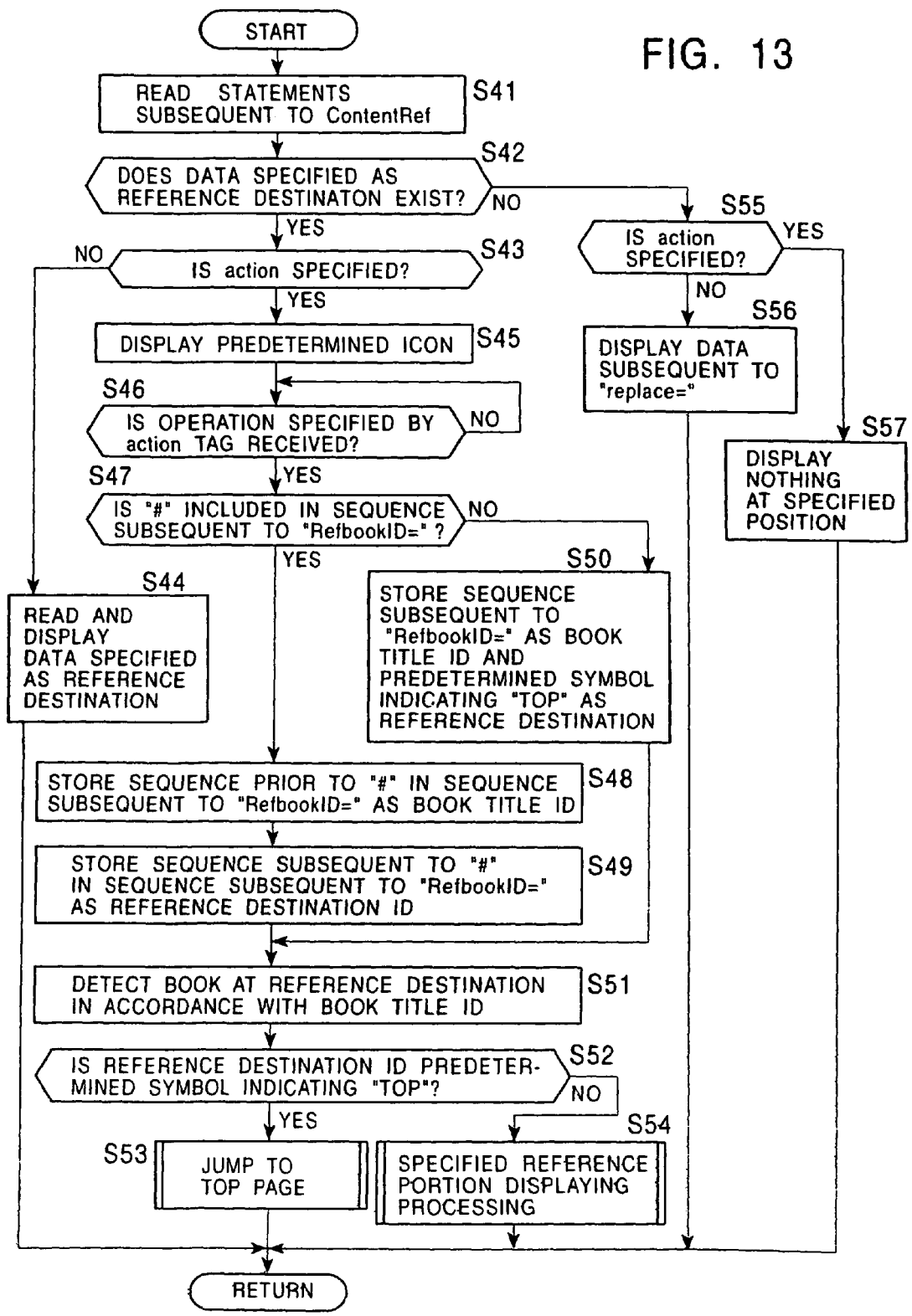
FIG. 13 is a flowchart showing a specified-file reference process.

The GetFile commands shown in FIG. 13 specify the filenames of files to be downloaded. For example, a predetermined URL stores a plurality of pieces of data. When the user wants to selectively display desired data from among these pieces of data, the filenames need to be defined in the GetFile commands.

When predetermined data, such as a time-limited coupon, is to be displayed in the display area 144 only for a specified period a condition command condT is included between a GetInfo command and a GetFile command. As a condition, the period start date and end date are specified.

More specifically, it is assumed that <condT Type="day" From="2001/05/19" To="2001/11/19"/> is specified. During the period from May 19, 2001 to Nov. 19, 2001, a file specified by the URL and filename (http://www.aaa.com/happy/present.txt), which is specified subsequent to href, is downloaded in accordance with the GetFile tag. The downloaded file is stored under the filename present.txt as the resource file 122 in the file recording unit 113 and is displayed in the display area 144.

Accordingly, an e-book having a mixture of information that needs to be updated frequently, information that does not need to be updated for a relatively long period, and information that does not need to be updated at all can be provided to the user. Also, information can be updated automatically (i.e., so-called background processing) without the user consciously performing a special operation, such as accessing a predetermined WWW server through the Internet and downloading information.

When no filename is specified subsequent to href and when a specified file obtaining source has a plurality of files, all the files recorded in the file obtaining source are downloaded, and the downloaded files are automatically numbered and stored as the resource files 122 in the file recording unit 113. For example, all the files can be displayed in a list in a specified display area. Alternatively, the files can be displayed one at a time by switching the file type to be displayed at predetermined intervals, such as every 10 seconds or every 30 seconds.

Figure 12:
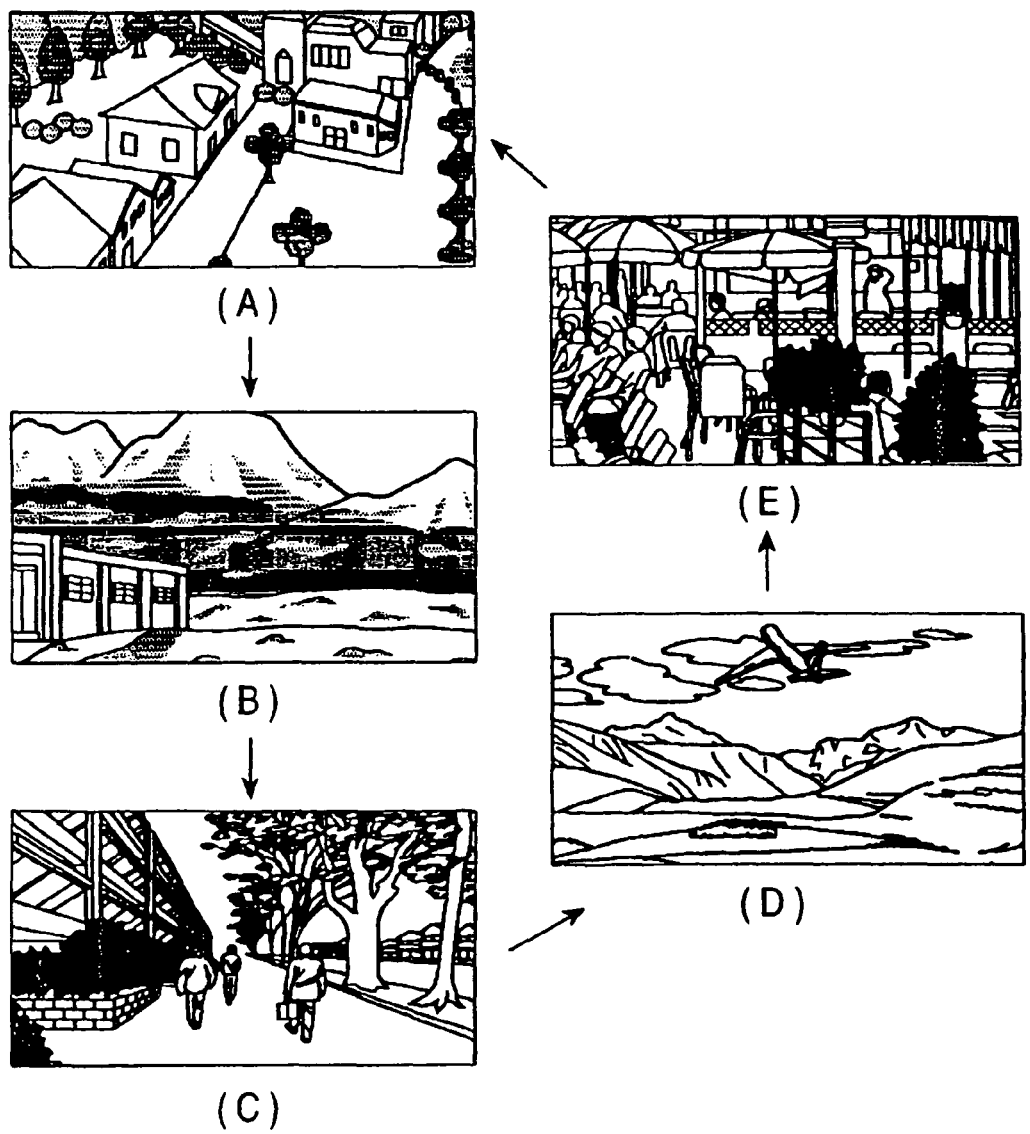
FIG. 12 illustrates a case in which a plurality of pieces of image data is referenced.

For example, when a source for obtaining the resource files 122 or 124 to be displayed in the display area 141 shown in FIG. 11 stores a plurality of landscape images, such as those shown in FIG. 12, the tag information decoder 111 can display the plurality of landscape images in the display area 141 by switching the image to be displayed at predetermined intervals. Thus, up-to-date information relating to content can be delivered to many users in limited space on a page. This can enhance user's enjoyment in viewing the page.

The specified-file reference process performed in step S7 of FIG. 6 will now be described by referring to the flowchart shown in FIG. 13.

In step S41, the tag information decoder 111 reads a statement(s) subsequent to ContentRef in the corresponding content file 121 or 123. In step S142, it is determined whether or not data specified as a reference destination included subsequent to RefbookID is stored in the file recording unit 113 or the external recording unit 114.

A source of the content file 121 or 123 describes a recipe as an example of the content file 121 or 123 of an e-book to which the present invention is applied.

In the content file 121 or 123, processing in accordance with tags included therein is performed. For example, the text "Egg Sunny-Side Up" is displayed as a main title, and image data specified by the filename "eggsunnysideupserving-.Bmp" is displayed. Since there is a ContentRef tag at the head of an other-content reference portion 151, the specified-file reference process shown in FIG. 13 is performed. Since "00000002#2" is specified as a RefbookID attribute, it is determined in step S42 whether or not the content file 121 or 123 having the BookID 00000002 is recorded in the file recording unit 113 or the external recording unit 114, respectively.

The BookID tag is a unique number assigned to the content file 121 or 123. Not all content files need to have BookID, although BookID needs to be assigned at least to a content file to be referenced by the specified-file reference process.

If it is determined in step S42 that there is data specified as the reference destination included subsequent to the RefbookID attribute, the tag information decoder 111 determines in step S43 whether or not an action attribute is specified subsequent to the RefbookID attribute.

If it is determined in step S43 that no action attribute is specified, in step S44, the tag information decoder 111 reads the data specified as the reference destination from the file recording unit 113 or the external recording unit 114. The tag information decoder 111 generates display image data for displaying, at a predetermined position, reference-destination data in a size specified by a width attribute and a height attribute in the other-content reference portion 151 in the content file 121 or 123 (wherein in this case the width is 70% and the height is 30% relative to the basic content screen size) and outputs the generated data to the display controller 115. The display controller 115 controls the display unit 116 to display a display image corresponding to the supplied display image data.

As an example of data specified as a reference destination included subsequent to the RefbookID attribute, in the content file 121 or 123 edited for performing the specified-file reference process, a BookID tag is included at the top thereof. The BookID is included between <BookID>and </BookID>. The BookID a unique number assigned to each e-book. The content file 121 or 123 having the BookID tag is provided with a reference area 161 enclosed by <Float>and </Float>. One content file 121 or 123 may have a plurality of reference areas 161. Float tags may be defined for all pieces of data in the content file 121 or 123.

Figure 14:
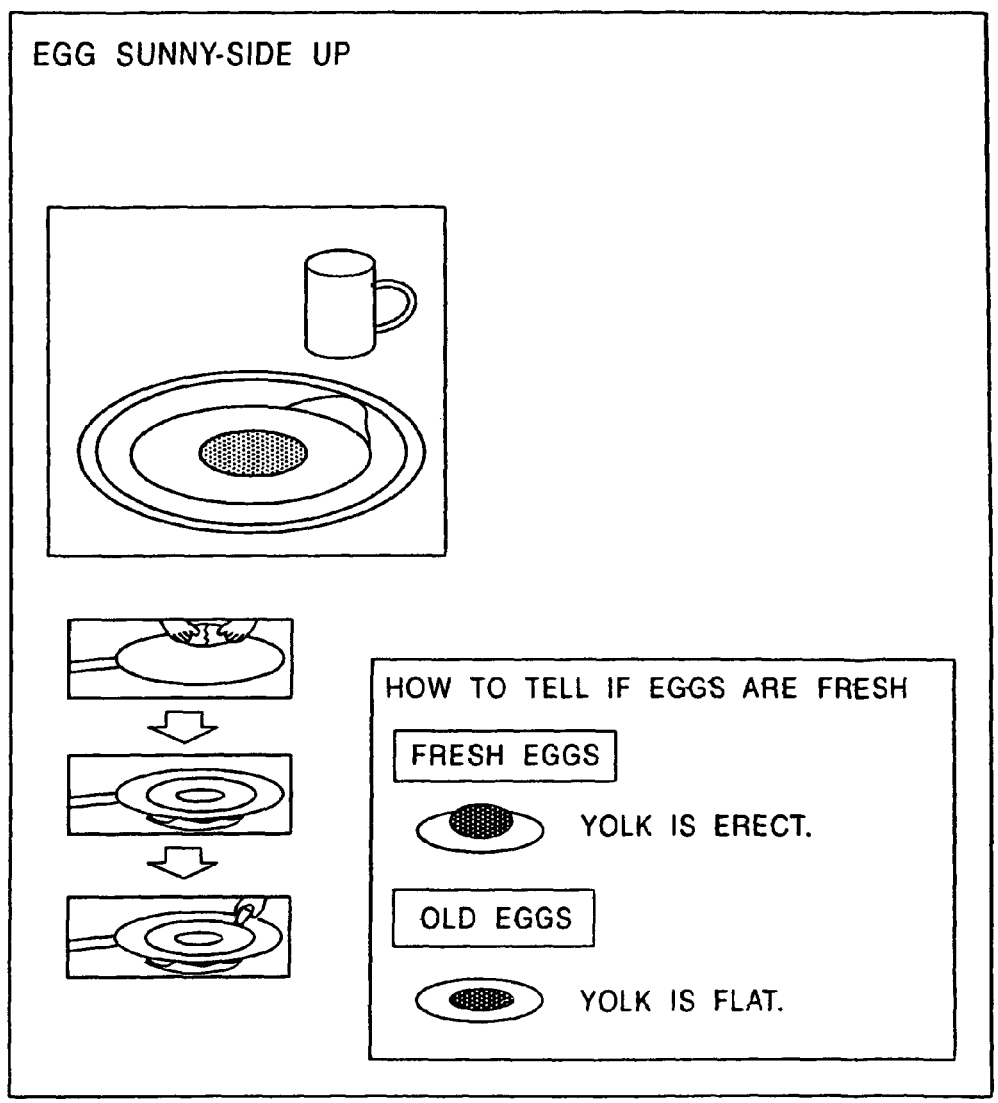
FIG. 14 illustrates an e-book display screen displaying a reference portion.

Since a display screen displayed by the content file 121 or 123 includes information in the reference area 161, a display screen shown in FIG. 14 is displayed. The information in the display area 161 is displayed in a display area 171.

As an example of a source of the content file 121 or 123 in which an action attribute is specified, a tag 181 includes attributes subsequent to ContentRef. Subsequent to a RefbookID attribute, the tag 181 includes an action attribute, an icon attribute, and a reference-data display method to be performed when a specified operation is performed on an icon.

Figure 15:
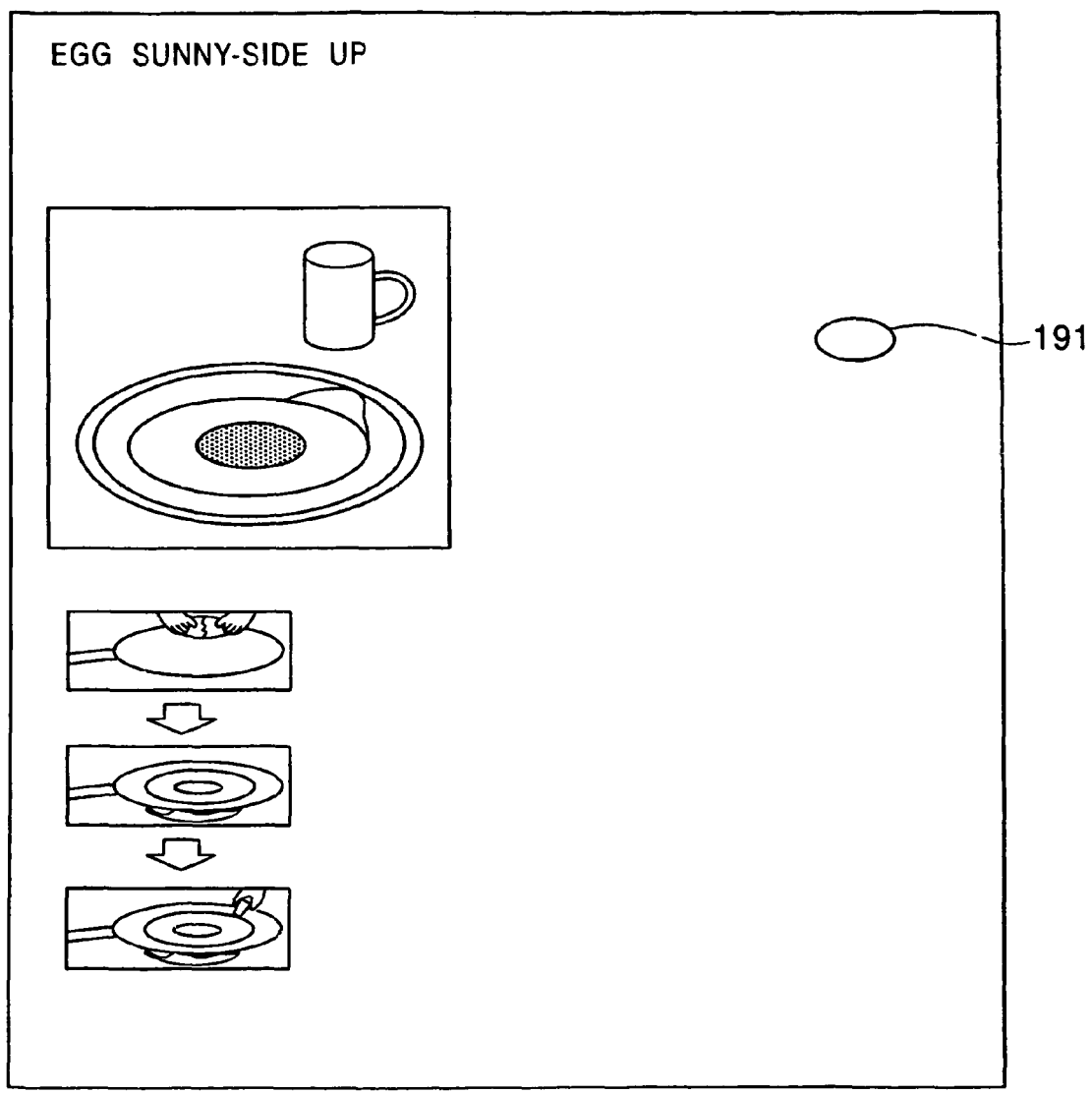
FIG. 15 illustrates the e-book display screen displaying an icon.

FIG. 15 shows a display image corresponding to the content file 121 or 123. As shown in FIG. 15, an icon 191 is displayed at a corresponding position in the content file 121 or 123. When it is determined by a process described below that the operation indicated by the action attribute is performed, the reference data is displayed in accordance with the attributes included in the tag 181.

In step S46, the tag information decoder 111 determines whether or not the operation specified by the action attribute is input (received) on the basis of a signal input from the operation input unit 112. If it is determined in step S46 that the specified operation is not input (received), the processing in step S46 is repeated until the specified operation is input.

If it is determined in step S46 that the specified operation is input (received), in step S47, the tag information decoder 111 determines whether or not "#" is included in a sequence subsequent to "RefbookID=".

If it is determined in step S47 that "#" is included in the sequence subsequent to "RefbookID=", in step S48, the tag information decoder 111 stores a sequence prior to "#" in the sequence subsequent to "RefbookID=" as a book title ID. In step S49, the tag information decoder 111 stores a sequence subsequent to "#" in the sequence subsequent to "RefbookID=" as a reference destination ID.

If it is determined in step S47 that no "#" is included in the sequence subsequent to "RefbookID=", in step S50, the tag information decoder 111 stores the sequence subsequent to "RefbookID=" as a book title ID and a predetermined symbol (e.g., a predetermined character string) indicating the "top" as a reference destination ID.

After the processing in step S49 is terminated or after the processing in step S50 is terminated, in step S51, the tag information decoder 111 searches the file recording unit 113 and the external recording unit 114 for an e-book (corresponding to the content file 121 or 123) specified as the reference destination.

In step S52, the tag information decoder 111 determines whether or not the reference destination ID stored in step S49 or in step S50 is a predetermined symbol indicating the "top".

Figure 17:
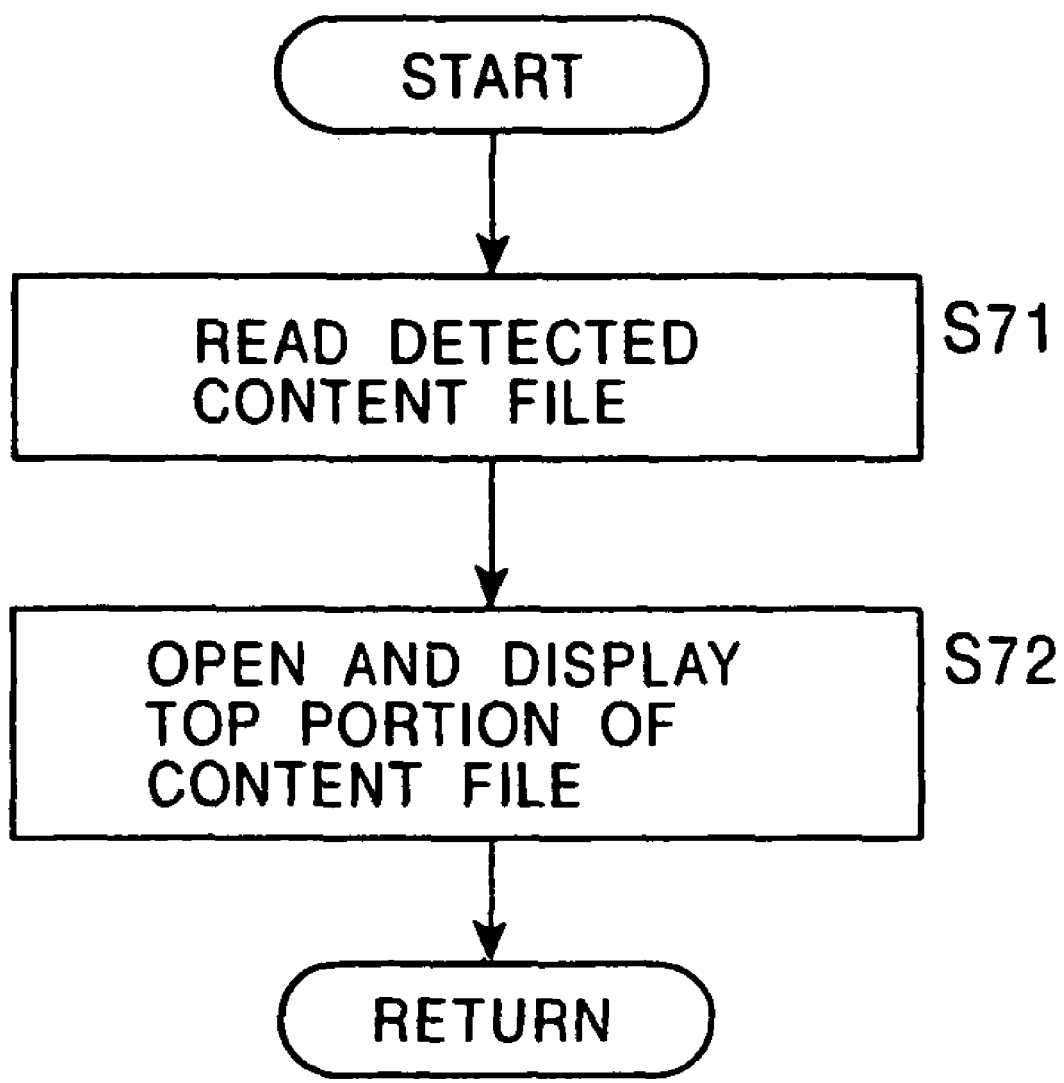
FIG. 17 is a flowchart showing a jumping process of jumping to the top page.

If it is determined in step S52 that the reference destination ID is a predetermined symbol indicating the "top", in step S53, a jumping process of jumping to the top page, which will be described below using a flowchart shown in FIG. 17, is performed. The process then returns to step S9 in FIG. 6.

If it is determined in step S52 that the reference destination ID is a predetermined symbol indicating the "top", in step S53, a jumping process of jumping to the top page, which will be described below using a flowchart shown in FIG. 17, is performed. The process then returns to step S9 in FIG. 6.

Figure 19:
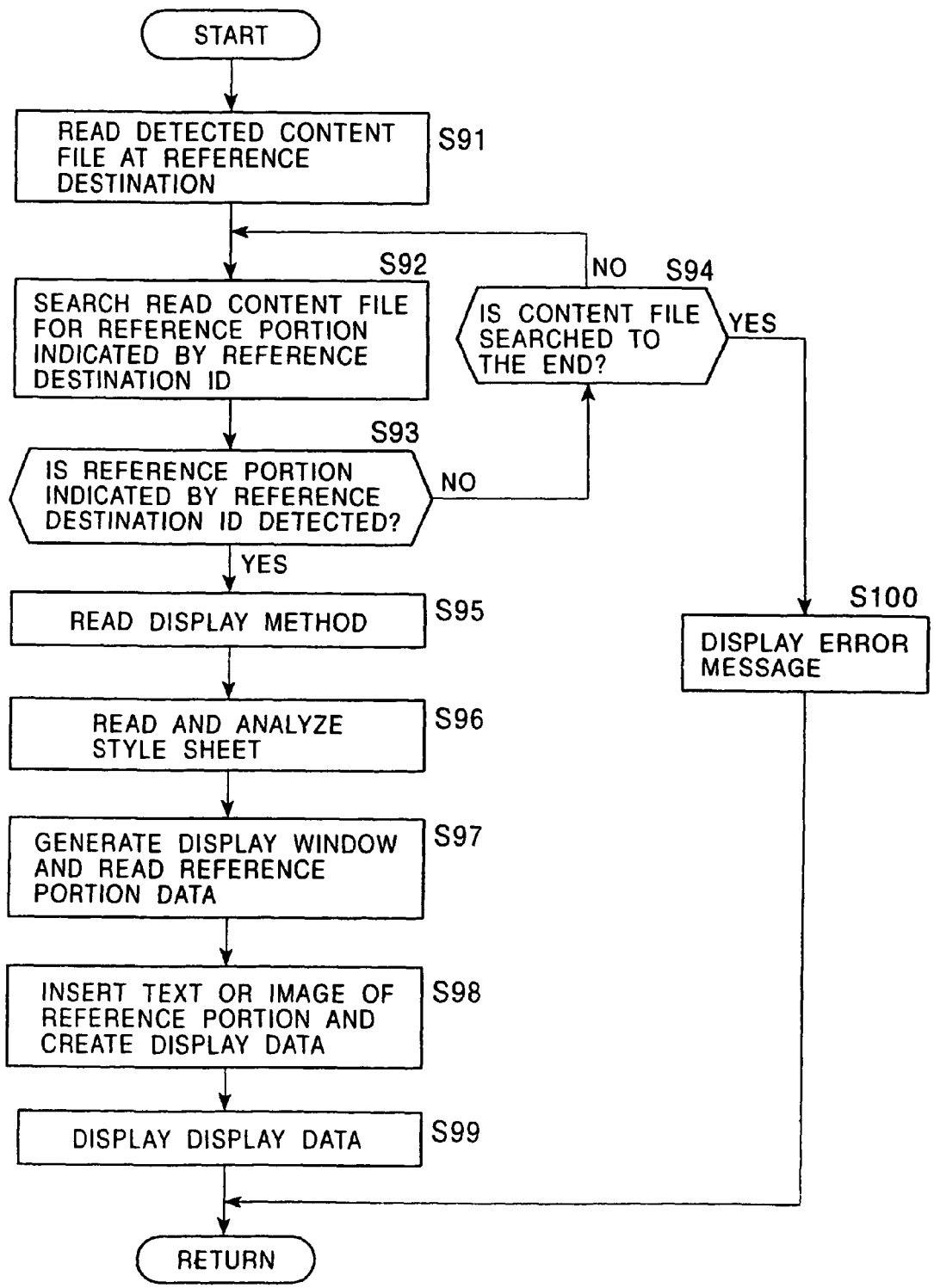
FIG. 19 is a flowchart showing a process of displaying a specified reference portion.

If it is determined in step S52 that the reference destination ID is not a predetermined symbol indicating the "top", in step S54, a process of displaying a specified reference portion, which will be described using a flowchart shown in FIG. 19, is performed. The process then returns to step S9 in FIG. 6.

If it is determined in step S42 that no data specified as the reference destination included subsequent to the RefbookID attribute is detected, the tag information decoder 111 determines in step S55 whether or not an action attribute is specified.

If it is determined in step S55 that no action attribute is specified, the tag information decoder 111 generates in step S56 display data for displaying data subsequent to "replace=" and outputs the generated display data to the display controller 115. The display controller 115 controls the display unit 116 to display a display screen corresponding to the data supplied from the tag information decoder 111. The process then returns to step S9 in FIG. 6.

More specifically, if there is no data specified as the reference destination included subsequent to the RefbookID attribute in the content file 121 or 123, that is, if there is no content file 121 or 123, as shown in FIG. 16 a display area 201 displays, in place of the specified data, information included subsequent to "replace=".

If it is determined in step S55 that an action attribute is specified in step S56, the tag information decoder 111 generates display data for displaying nothing at a specified position and outputs the generated display data to the display controller 115. The display controller 115 controls the display unit 116 to display a display screen corresponding to the data supplied from the tag information decoder 111. The process then returns to step S9 in FIG. 6.

Accordingly, information can be shared among a plurality of e-books. Information can be displayed as if it were described in an e-book being read. Also the user can be informed of whether or not there is data to be referenced. A message prompting the user to purchase an e-book required to display detailed information can be displayed.

The jumping process of jumping to the top page, which is performed in step S53 in FIG. 13, will now be described by referring to the flowchart shown in FIG. 17.

In step S71, the tag information decoder 111 reads the detected reference-destination content file from the file recording unit 113 or the external recording unit 114.

In step S72, the tag information decoder 111 generates display data for opening and displaying the top portion of the content file read in step S71 and outputs the generated display data to the display controller 115. The display controller 115 controls the display unit 116 to display a display screen corresponding to the data supplied from the tag information decoder 111. The process then returns to step S9 in FIG. 6.

The jumping process of jumping to the top page, which is illustrated with reference to the flowchart shown in FIG. 17, is performed in a case shown in FIG. 18. Specifically, a novel or a cartoon is in a plurality of volumes. In order to display from the last part of one volume of an e-book to the first part of the subsequent volume of the e-book, the jumping process is performed.

Figure 18:
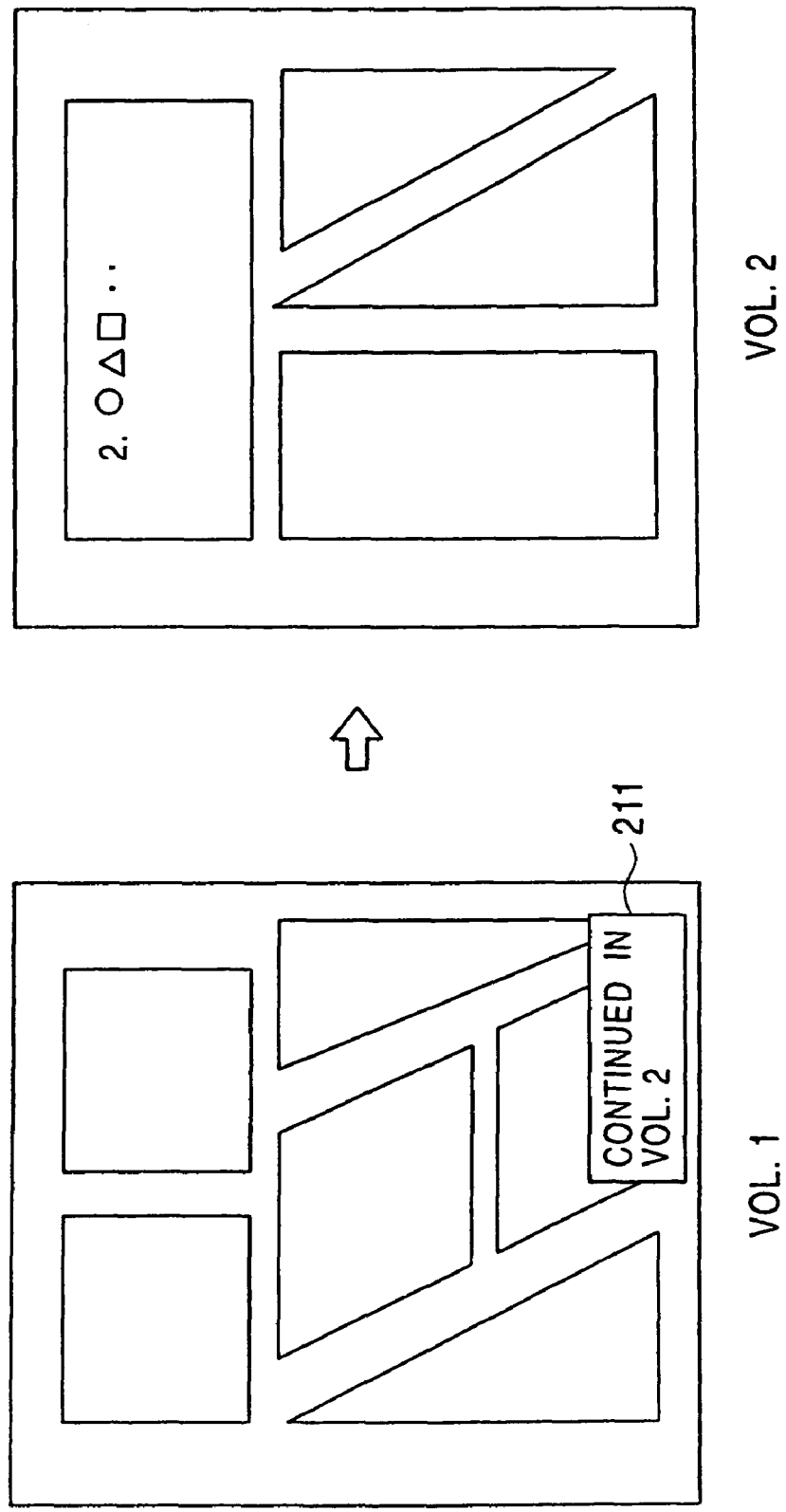
FIG. 18 illustrates a specific example of the jumping process of jumping to the top page.

In this case, an icon subjected to an action is displayed as, for example, in FIG. 18, an icon 211 displayed at the last part of the first volume. When the icon 211 is subjected to a specified action, such as when the icon 211 is clicked, the top page of the second volume is opened. When there is no content file 121 or 123 corresponding to the second volume in the file recording unit 113 or the external recording unit 114, the icon 211 is not displayed (due to the processing in step S57 in the specified-file reference process illustrated using FIG. 13).

The process of displaying a specified reference portion, which is performed in step S54 in FIG. 13, will now be described by referring to the flowchart shown in FIG. 19.

In step S91, the tag information decoder 111 reads the detected content file at the reference destination from the file recording unit 113 or the external recording unit 114.

In step S92, the tag information decoder 111 searches the read content file for a reference portion indicated by the reference destination ID included in the <Float> tag.

In step S93, the tag information decoder 111 determines whether or not the reference portion indicated by the reference destination ID is detected.

If it is determined in step S93 that no reference portion indicated by the reference destination ID is detected, in step S94, the tag information decoder 111 determines whether or not the content file is searched to the end. If it is determined in step S94 that the content file is not searched to the end, the process returns to step S92, and the processing from step S92 onward is repeated.

If it is determined in step S93 that the reference portion indicated by the reference destination ID is detected, the tag information decoder 111 reads in step S95 a display method specified by a tag subsequent to the tag indicating the reference destination. The display method includes, for example, a method of opening another window and causing this window to display reference-portion information and a method of opening a popup window and causing the popup window to display reference-portion information.

In step S96, the tag information decoder 111 reads and analyzes a corresponding style sheet on the basis of the display method read in step S95. A style sheet is a display image template prepared in advance for each display format. For example, when the display method uses windows, a window containing no information is read as a template for displaying windows. When the display method uses popup windows, a popup window containing no information is read as a template for displaying popup windows.

In step S97, the tag information decoder 111 determines the display size with reference to the amount of information included therein, generates a display window, and reads data for the detected reference portion.

In step S98, the tag information decoder 111 generates display data by inserting text data or image data for the reference portion, which is read in step S97, into the window or the popup window, which is generated in step S97.

In step S99, the tag information decoder 111 outputs the display data, which is generated in step S98, to the display controller 115. The display controller 115 controls the display unit 116 to display a display window or a popup window corresponding to the supplied display data. The process then returns to step S9 in FIG. 6.

If it is determined in step S94 that the file is searched to the end, the tag information decoder 111 generates in step S100 data corresponding to a display screen for displaying an error message and outputs the generated data to the display controller 115. The display controller 115 controls the display unit 116 to display an error message corresponding to the supplied display data. The process then returns to step S9 in FIG. 6.

Figure 20:
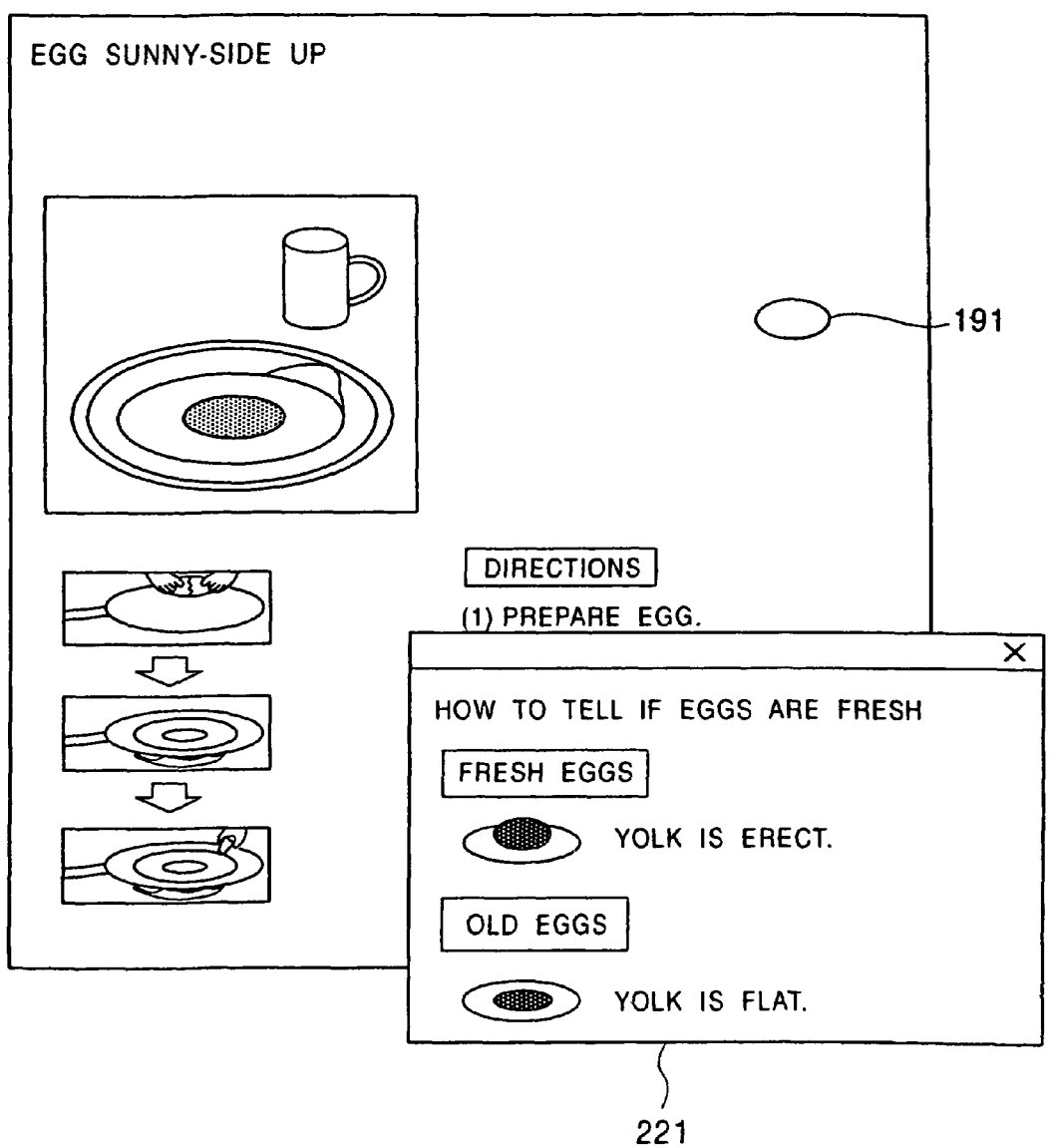
FIG. 20 illustrates the e-book display screen in which another window displays a reference portion.

FIG. 20 shows a display screen when the icon 191, which is described using FIG. 15, is clicked. In this case, a display screen 221 showing the reference portion is displayed at a position specified by a tag. Since the tag 181, corresponding to the display screen shown in FIG. 15, specifies popuppos="upper", the display window 221 is displayed so as to overlap a first-displayed page.

Figure 22:
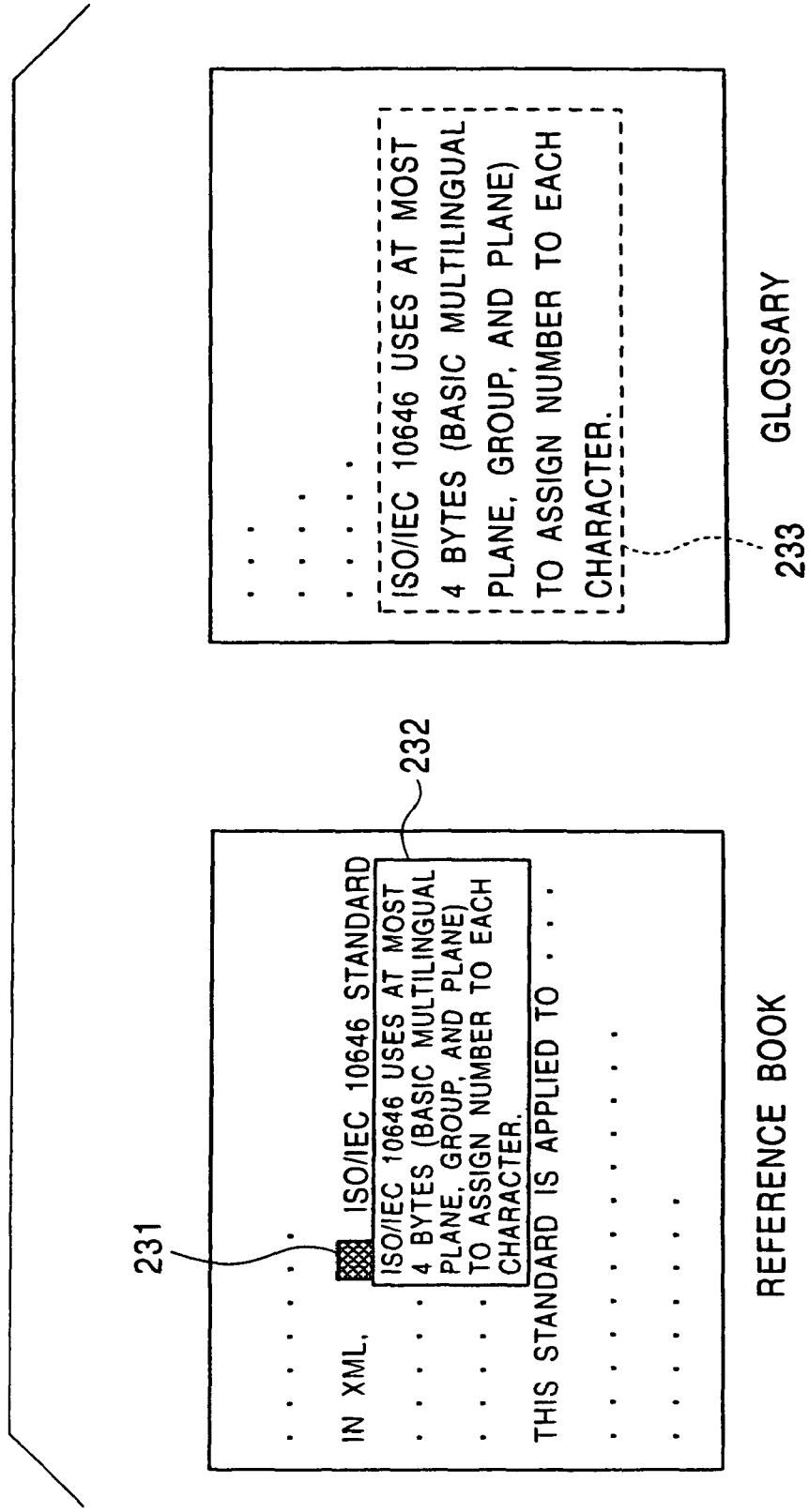
FIG. 22 illustrates the reference book and the glossary to which the present invention is applied.

Referring to FIGS. 21 to 23, examples of the utilization of the above-described process of displaying a specified reference portion in different cases will now be described.

For example, as shown in FIG. 21, an e-book corresponding to a reference book has the content file 121 or 123. In the content file 121 or 123, a ContentRef tag is included in a text portion enclosed by <P>and </P>, and a specified BookID tag value is 00000001. A book corresponding to this tag value is a glossary having the content file 121 or 123. In such a case, based on the ContentRef tag and on tags and information included subsequent to the ContentRef tag, as shown in FIG. 22, an icon 231 is displayed between corresponding text portions (between "In XML" and "ISO/IEC 10646") of a corresponding page of the reference book. When the icon 231 is clicked, a corresponding reference portion 233 of the glossary is displayed on a popup window 232.

The icon 231 can be displayed at any position on a display screen of an e-book, such as between text portions. With such a utilization method, a user who wants to utilize an e-book for studying can improve learning efficiency. When there is no content file 121 or 123 to be referenced, the unnecessary icon 231 is not displayed. The larger the number of related e-books the user purchases, the larger the number of icons to be displayed to indicate related information becomes. Accordingly, a series of products can have greater added value.

Similar advantages can be achieved by related e-books, namely, a workbook and a reference book. For example, as shown in FIG. 23, a user has both a predetermined workbook and a reference book. In the user's workbook, an icon 241 and an icon 242 for displaying explanation of corresponding portions of the reference book are displayed. When the icon 241 is clicked or when the mouse is placed over the icon 241 (that is, when a predetermined operation is performed on the icon 241), a corresponding explanation portion 243 of the reference book is displayed. When the icon 242 is clicked or when the mouse is placed over the icon 242 (that is, when a predetermined operation is performed on the icon 242), a corresponding explanation portion 244 of the reference book is displayed. Accordingly, the user's learning efficiency can be improved, and a series of products can have greater added value.

At an e-book publisher side, according to the present invention, e-book information can be shared among a plurality of e-books. When it is necessary to include the same data in a plurality of e-books, including all pieces of data in each e-book may make it difficult to include all necessary information since each recording medium has a limited recording capacity. According to the present invention, e-books can be edited so that information can be read from another e-book or another information source depending on the degree of importance of information.

In the foregoing processes, e-books mainly containing image data or text data have been described. However, similar processes can be performed when e-books include audio data or video data.

The above-described series of processes can be performed by software. Software can be installed by installing, from a recording medium, a program forming the software into a computer included in dedicated hardware or into a general personal computer capable of performing various functions by installing various programs.

The recording medium includes, as shown in FIGS. 1 to 4, package media having a program recorded therein, which is to be distributed, aside from a computer, to provide users with the program. The package media includes the magnetic disk 14 (including flexible disk), the optical disk 15 (including CD-ROM and DVD (Digital Versatile disk)), the magnetooptical disk 16 (including MD (Mini-Disk)), or the semiconductor memory 17.

In the description, steps for writing the program recorded in the recording medium include not only processing performed in time series in accordance with the written order but also parallel or discrete processing performed not necessarily in time series.

In the present description, the system represents an overall apparatus formed by a plurality of apparatuses.

What is claimed is:

1. An information processing device for reading an electronic book comprising:
   a processor;
   instructions stored thereon and executable by the processor for performing a method, including:
   (a) displaying contents information of an electronic book on an information processing device connected to a network;
   (b) recording the contents information onto the information processing device;
   (c) analyzing the recorded contents information at the information processing device to identify (i) updateable information and (ii) substantially unvarying information, the contents information including update frequency information indicative of an update frequency of each of the updateable information;
   (d) obtaining at the information processing device from the network an update of the updateable information identified in (c) in accordance with the update frequency specified for each of the updateable information, wherein the obtaining includes determining elapse of a time period;
   (e) recording the obtained update at the information processing device;
   (f) accessing and displaying at the information processing device a first page of the electronic book, containing the substantially unvarying information from the contents information already recorded together with the updateable information updated with the recorded contents information; and
   (g) then accessing and displaying at the information processing device a second page different from the first page of the electronic book, containing the substantially unvarying information from the contents information already recorded together with the updateable information updated with the recorded contents information.

2. The information processing device for reading an electronic book according to claim 1, wherein the method further comprises displaying a list of all files in a specified display area of the information processing device.

3. The information processing device for reading an electronic book according to claim 2, wherein the files are displayed one at a time by switching the file type to be displayed at intervals of about every 10 to 30 seconds.

4. The information processing device for reading an electronic book according to claim 1, wherein the contents information further includes a storage location of the update.

5. The information processing device for reading an electronic book according to claim 1, wherein (e) includes recording a plurality of updates and settings a unique filename for each of the plurality of updates.

6. An electronic book reader method, comprising:
   (a) displaying contents information of an electronic book on an information processing device connected to a network;
   (b) recording the contents information onto the information processing device;
   (c) analyzing the recorded contents information at the information processing device to identify (i) updateable information and (ii) substantially unvarying information, the contents information including update frequency information indicative of an update frequency of each of the updateable information;
   (d) obtaining at the information processing device from the network an update of the updatable information identified in (c) in accordance with the update frequency specified for each of the updateable information, wherein the obtaining includes determining elapse of a time period;
   (e) recording the obtained update at the information processing device;
   (f) accessing and displaying at the information processing device a first page of the electronic book, containing the substantially unvarying information from the contents information already recorded together with the updateable information updated with the recorded contents information; and
   (g) then accessing and displaying at the information processing device a second page different from the first page of the electronic book, containing the substantially unvarying information from the contents information already recorded together with the updateable information updated with the recorded contents information.

7. A recording medium having a computer readable program recorded therein, the program comprising:
   (a) displaying contents information of an electronic book on an information processing device connected to a network;
   (b) recording the contents information onto the information processing device;
   (c) analyzing the recorded contents information at the information processing device to identify (i) updateable information and (ii) substantially unvarying information, the contents information including update frequency information indicative of an update frequency of each of the updateable information;
   (d) obtaining at the information processing device from the network an update of the updatable information identified in (c) in accordance with the update frequency specified for each of the updateable information, wherein the obtaining includes determining elapse of a time period;
   (e) recording the obtained update at the information processing device;
   (f) accessing and displaying at the information processing device a first page of the electronic book, containing the substantially unvarying information from the contents information already recorded together with the updateable information updated with the recorded contents information; and
   (g) then accessing and displaying at the information processing device a second page different from the first page of the electronic book, containing the substantially unvarying information from the contents information already recorded together with the updateable information updated with the recorded contents information.

* * * * *